United States Patent [19]
Lim

[11] Patent Number: 5,339,164
[45] Date of Patent: Aug. 16, 1994

[54] METHOD AND APPARATUS FOR ENCODING OF DATA USING BOTH VECTOR QUANTIZATION AND RUNLENGTH ENCODING AND USING ADAPTIVE RUNLENGTH ENCODING

[75] Inventor: Jae S. Lim, Winchester, Mass.

[73] Assignee: Massachusetts Institute of Technology, Cambridge, Mass.

[21] Appl. No.: 813,326

[22] Filed: Dec. 24, 1991

[51] Int. Cl.$^5$ .............................................. G06K 9/36
[52] U.S. Cl. .................................. 358/261.1; 358/430;
   358/261.3; 382/56; 348/441; 348/390
[58] Field of Search ................. 358/11, 133, 138, 401,
   358/426, 261.1, 261.2, 261.3, 261.4, 430, 431,
   432, 452, 453; 382/41, 56; 395/114, 128

[56] References Cited

U.S. PATENT DOCUMENTS

| | | | |
|---|---|---|---|
| 4,189,711 | 2/1980 | Frank | 340/146 |
| 4,792,981 | 12/1988 | Cahill, III et al. | 382/56 |
| 4,831,659 | 5/1989 | Miyaoka et al. | 382/56 |
| 4,984,076 | 1/1991 | Watanabe et al. | 358/133 |
| 5,109,451 | 4/1992 | Aono et al. | 382/56 |
| 5,136,371 | 8/1992 | Savatier et al. | 358/133 |
| 5,136,376 | 8/1992 | Yagasaki et al. | 358/133 |
| 5,162,923 | 11/1992 | Yoshida et al. | 358/433 |

OTHER PUBLICATIONS

Wallace, G. "The JPEG Still Picture Compression Standard," Communications of the ACM, Apr. 1991, pp. 30–43.
Lim, J. S. Two Dimensional Signal and Image Processing, Prentice Hall, Englewood Cliffs, N.J. (1990) pp. 613–617.

Primary Examiner—Bentsu Ro
Attorney, Agent, or Firm—Steven J. Weissburg

[57] ABSTRACT

A method is disclosed of encoding location information pertaining to a source position signal characterized by positions of a set of selected coefficients, ordered in at least one dimension, there being a generally expected pattern of selected coefficients in the position signal with respect to the type of source signal. The method includes the steps of: for a first component of the position signal, generating a signal encoding the locations of the selected coefficients by a method that has a relatively high efficiency with respect to the generally expected pattern of selected coefficients in the first component; and for a second component of the position signal, encoding the locations of the selected coefficients by a method that has a relatively high efficiency with respect to the generally expected pattern of selected coefficients in the second component. For instance, runlength encoding can be used for both components, with different codebooks being used for each. Alternatively, vector coding can be used for one component, with runlength encoding (either standard, or with multiple codebooks) being used for the other component. Both encoding and decoding methods are described, as well as apparatus to carry out the methods of encoding and decoding described.

16 Claims, 13 Drawing Sheets

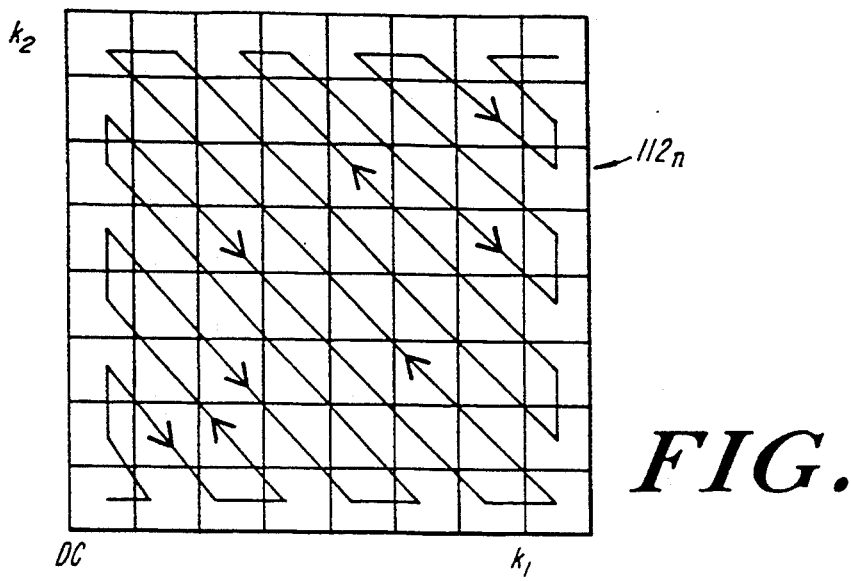
*FIG. 4*
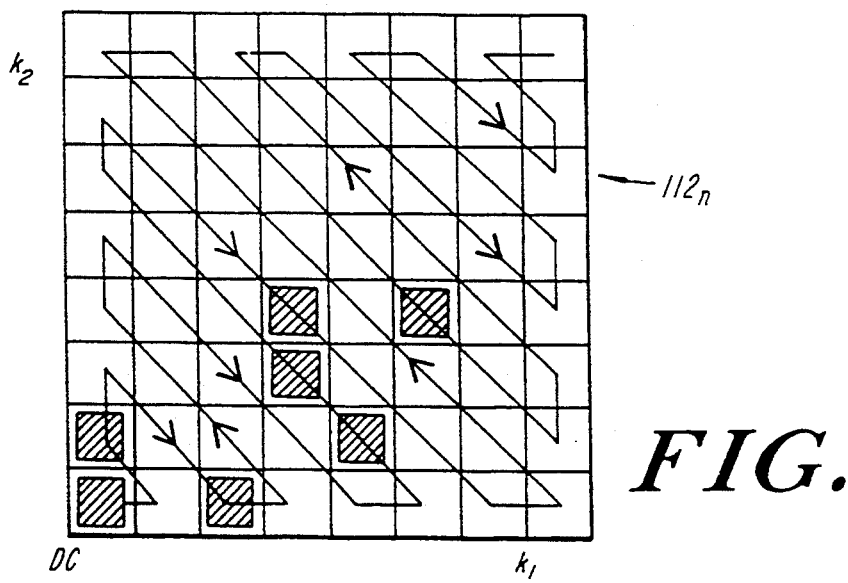
*FIG. 5*
| RUNLENGTH | CODEWORD |
|---|---|
| 0 | 000000 |
| 1 | 000001 |
| 2 | 000010 |
| 3 | 000011 |
| . | . |
| . | . |
| . | . |
| 62 | 111110 |
| 63 | 111111 |
*FIG. 6A*
| RUNLENGTH | CODEWORD |
|---|---|
| 0 | 0 |
| 1 | 100 |
| 2 | 110 |
| 3 | 101 |
| 4 | 1110 |
| 5 | 1111 |
*FIG. 6B*

| PATTERN | CODEWORD |
|---|---|
|  | 0011...110 |
|  | 1001...101 |
| ⋮ | ⋮ |
|  | 1111...001 |

METHOD AND APPARATUS FOR ENCODING OF DATA USING BOTH VECTOR QUANTIZATION AND RUNLENGTH ENCODING AND USING ADAPTIVE RUNLENGTH ENCODING

The present invention relates generally to the field of signal processing, and more specifically to data encoding and compression. The invention relates most specifically to a method and an apparatus for the encoding and compression of data using runlength coding alone with an adaptive codebook, and using both vector quantization and runlength encoding, with or without an adaptive codebook. The subject data may be in one, two, three or more dimensions; however most practical uses will be applied to data in two and three dimensions. The invention has practical applications in the field of image processing, including television, video telephone; newspaper wire transmission; medical imaging; satellite photo-imaging and many other image applications. The invention also has applications in three-dimensional data processing, such as video processing systems, solid-body modelling and meteorological and geological mapping.

BACKGROUND OF THE INVENTION

In the processing of images, the spatial representation of an image in, e.g., two-dimensions, is typically transformed into a signal representing the image in a different data space. Included among the reasons for this transformation is to compress or minimize the amount of digital data required to adequately represent the image. Reduction of the data requirements enhances the speed at which the data can be communicated along fixed bandwidth communications channels as well as reduces the amount of memory required to store the image. Much of the following background discussion is taken from the excellent article by Wallace, G., "The JPEG Still Picture Compression Standard," *Communications of the ACM*, April, 1991, pp. 30–43, which is incorporated herein by reference.

In the basic case of a two dimensional grayscale image, the continuous (in space and amplitude) grayscale intensities across the two dimensions of the image are converted to an array of discrete pixels, each having a discrete intensity chosen from a set of typically fixed quantization levels. A typical digital image is made up of an array of $n_1$ by $n_2$ (e.g. 512 by 512) pixels, each one quantized to 256 intensity levels (which levels can be represented by eight digital signal bits. Each level is commonly denoted by an integer, with 0 corresponding to the darkest level and 255 to the brightest.

The sampling of the image can be conducted according to many techniques. A basic technique is to simply divide the entire gray scale intensity level into 256 levels, to measure the intensity at each of $n_1$ locations across the image and for $n_2$ rows down the image, and to assign to each of the pixels in the array the one of the 256 levels that is closest to the actual measured intensity.

The result of the sampling is a digital image, that can be represented by an array of $n_1$ by $n_2$ integers with amplitudes between 0 and 255. Technically, to transmit the image, it is possible to simply transmit this data in a stream, one row after another. However, such treatment would require transmission of a large amount of data (eight bits per pixel). It is well know that significant portions of images are represented by pixels that are similar to each other, and that are correlated with each other. Significant savings in data requirements can be achieved by well-known techniques that exploit the redundancy that arise in many images.

A well known technique is to transform the image from a spatial domain, i.e. a domain where an intensity amplitude is correlated to a spatial location in the $n_1$ and $n_2$ dimensions, to another domain, such as a spatial frequency domain. In the spatial frequency domain, the image is represented by amplitudes at spatial frequencies. Spatial frequencies can be considered to be related to the degree of change in intensity from one pixel to the next along either the horizontal or vertical dimensions (or combinations thereof). For instance, an image of vertical bars of a certain width alternating from black to white will be characterized by a set of spatial frequencies. For a similar image with narrower bars, the set of spatial frequencies differs indicating the higher frequency of change from one pixel to the next. Similarly, variations in the vertical dimension also bring about similar changes. Coding techniques which transform the spatial image into another domain, such as a frequency domain, are generally referred to as "transform" coding techniques.

A typical transform coding technique is known as the DCT or discrete cosine transform technique. The name derives from the fact that a cosine function is applied to signal elements that are discrete in space, rather than a spatially continuous signal.

DCT compression can be thought of as the compression of a stream of t total sample blocks, $102_1$, $102_2$, $102_3$, ..., $102_n$, ... $102_t$, of the original image 104, shown schematically in FIG. 1, in $n_1$ and $n_2$. Each block $102_n$ is made up of an array of contiguous pixels 106. A typical block size is an 8 by 8 pixel block, for a total of 64 pixels. In the case shown in FIG. 1, t=4,096.

FIG. 2 shows the essential steps of a transform coding technique, such as a DCT for a single component, such as a gray scale amplitude. Each $8 \times 8$ block $102_n$ is input to the encoder 120. The data is passed to a DCT operator 122. In the DCT 122, the transform function is applied to the data in each block $102_n$ according to the following well known relation:

$$F(k_1,k_2) = \frac{1}{4} C(k_1)C(k_2) \left[ \sum_{n_1=0}^{7} \sum_{n_2=0}^{7} f(n_1,n_2) \cdot \cos\frac{(2n_1 + 1)k_1\pi}{16} \cos\frac{(2n_2 + 1)k_2\pi}{16} \right],$$

where $$C(k_1),C(k_2) = \frac{1}{\sqrt{2}} \text{ for, } k_1,k_2 = 0, \ C(k_1),C(k_2) = 1 \text{ otherwise.}$$

In the above expression, $F(k_1,k_2)$ is the transformed function in the variables $k_1$ and $k_2$ and $f(n_1,n_2)$ is the amplitude pattern of the original function in the block $102_n$ as a function of $n_1$ and $n_2$, the spatial dimensions.

The DCT 122 can be considered as a harmonic analyzer, i.e. a component that analyzes the frequency components of its input signal. Each $8 \times 8$ block $102_n$ is effectively a 64 point discrete signal which is a function of the two spatial dimensions $n_1$ and $n_2$. The DCT 122 decomposes the signal into 64 orthogonal basis signals, each containing one of the 64 unique two-dimensional (2-D) "spatial frequencies," which comprise the input signal's "spatial spectrum." The output of the DCT 122 is referred to herein as a "transform block" and is the set of 64 basis-signal amplitudes or "DCT coefficients" whose values are uniquely determined by the particular 64 point input signal, i.e. by the pattern of intensities in block $102_n$. Although the DCT transform is being used herein for explanatory purposes, other transforms, including sub-band transforms are applicable and may be used in conjunction with the invention.

The DCT coefficient values can thus be regarded as the relative amounts of the 2-D spatial frequencies contained in the 64 point input signal $102_n$. The coefficient with zero frequency in both dimensions $n_1$ and $n_2$ is called the "DC coefficient" and the remaining 63 coefficients are called the "AC coefficients."

Experience has shown that with typical images 104, sample values from pixel to pixel typically vary slowly across an image. Thus, data compression is possible by allocating many of the available bits of the digital signal to the lower spatial frequencies, which correspond to this slow spatial variation. For a typical source block $102_n$, many of the spatial frequencies have zero or near-zero amplitude and need not be encoded. As shown schematically in FIG. 3, a typical graphical representation of a transform block $112_n$, which is the result of transforming a block $102_n$, by DCT, zero amplitude coefficients are indicated by white and non-zero amplitude coefficients are indicated by shading. A small shaded region 114 centered around the origin is surrounded by a large white region 116. This type of pattern typically arises for every $8 \times 8$ block.

After transformation in the DCT 122, Several other operations take place in quantizer 124 and encoder 126, which operations are explained below in more detail. It is appropriate to mention these operations now, so that the encoder will be fully understood. Basically, these operations further transform and encode the transformed signal $F(k_1, k_2)$ output from the DCT. From the DCT encoder 120, the signal is communicated over a communication channel, or stored, or otherwise treated. Eventually the compressed image data is input to DCT decoder 130, which includes a decoder 136, a dequantizer 134 and an inverse DCT ("IDCT") 132. The dequantizer 134 and decoder 136 reverse the effects caused by encoder 126 and quantizer 124, respectively. The output of dequantizer 134 is thus a function in the transformed data space $(k_1, k_2)$ and typically is in the form of an $8 \times 8$ block also. In the IDCT 132, an inverse transformation is applied to the data in each transform block. The transformation is designed to undo the effects of the forward transformation set out above, and its characteristics are well known to those of ordinary skill in the art.

The output of the IDCT is a reconstruction of an $8 \times 8$ image signal in the spatial dimensions of $n_1$ and $n_2$, generated by summing the basis signals. Mathematically, the DCT is a one-to-one mapping of 64 values between the image and the frequency domains. If the DCT and IDCT could be computed with perfect accuracy and if the DCT coefficients were not quantized as in quantizer 124 (and thus subsequently dequantized), the original 64 point signal $102_n$ could be exactly recovered. In principle, the DCT introduces no loss to the source image samples; it merely transforms them to a domain in which they can be more efficiently encoded.

Returning to the description of the encoding stage of the coding process, after output from the DCT 122, each of the, in this case, 64 DCT coefficients, is quantized with reference to a quantization, or reconstruction level table. One purpose of quantization is to discard information that is not visually significant. Another purpose of quantization is to obviate the need for an infinite number of bits, which would be the case if quantization were not used. In quantization, each coefficient is compared to the entries in the quantization table, and is replaced by the entry that is closest to the actual coefficient. Assuming for explanation purposes only that uniform length codewords are used. If 8 bits are used, then each coefficient can be quantized into the closest of 256 quantization or reconstruction levels. If only 7 bits are used, then only 128 reconstruction levels are available. Typically, however, the codewords will not be of uniform length.

The output of the quantizer 124 can be normalized. At dequantizer 134, the effect of any normalization is reversed. The output from the dequantizer are the quantized values set forth in quantization table used by quantizer 124.

If the aim of a particular signal processing task is to compress the image as much as possible without visible artifacts, each step size in the quantization table should ideally be chosen as a perceptual threshold or "just noticeable difference" for the visual contribution of its corresponding cosine basis function. These thresholds are also functions of the source image characteristics, display characteristics and viewing distance. For applications in which these variables can be reasonably well defined, psychovisual experiments can be performed to determine the best thresholds. Quantization is a many-to-one mapping, and therefore it is fundamentally lossy. It is the principal source of lossiness in DCT-based encoders.

After quantization, the DC coefficient is typically treated separately from the 63 AC coefficients, although, for purposes of the present invention, the DC component can also be considered together with the other coefficients. The DC coefficient is a measure of the average value of the 64 image samples. Because there is usually strong correlation between the DC coefficients of adjacent source blocks $102_n$, the quantized DC coefficient is typically encoded as the difference from the DC term of the previous transform block in the encoding order. The encoding order for blocks $102_n$ is typically a sinuous path along the $n_1$ direction, moving up one block at the end of a row of blocks, and so on, until the final block in the final row is reached. This is shown by the path S in FIG. 1. Other block encoding orders are also possible, such as a vertical sinuous pattern, or a sinuous pattern that has increasingly longer runs extending generally at a 45° angle to both axes. The differential treatment of the DC coefficients is beneficial because the difference between DC values takes up less energy than the DC values themselves, so fewer bits are required to encode the differences than to encode the DC values themselves.

After the DC coefficients have been coded, the set of AC coefficients are ordered, typically, in a zig-zag pattern, as shown in FIG. 4. This ordering begins with the low spatial frequency components, in both the $k_1$ and $k_2$ dimensions, and proceeds to the higher frequency components. As has been mentioned, the transformed images are typically characterized by relatively many large amplitude low frequency components and relatively many small amplitude higher frequency components. This zig-zag ordering helps in the case of run-length encoding to implement a coding of the locations in the transformed domain of the large and small amplitude coefficients.

Typically, the coefficient amplitude is compared with a threshold. Above the threshold, the amplitude is selected to be coded. Below the threshold, the amplitude is not selected to be coded and is set to zero. For discussion purposes, coefficients having amplitudes below the threshold are referred to as "non-selected" coefficients and sometimes as coefficients having zero amplitude, while coefficients having amplitudes above the threshold are referred to as "selected" coefficients, or as having non-zero amplitude. It is understood, however, that many of the so-called zero amplitude coefficients have small, non-zero amplitudes.

Because many of the coefficients are not selected, it is more efficient to code the location information by identifying which of the 63 AC coefficients are to be selected, and the value of their quantized coefficient, rather than digitally coding a coefficient value for each of the 64 spatial frequencies. The coefficients are identified by their locations in the ordered set defined by the transformed domain. Two techniques are known for coding which of the coefficients are non-zero. One technique is referred to as "runlength coding" and the other is referred to as "vector-quantization." Runlength encoding exploits the ordering imposed on the coefficients by the zig-zag pattern while vector-quantization exploits only the ordering inherent in the dimensional arrangement of the transformed domain.

According to the method of runlength encoding, the positions along the zig-zag path which have a selected coefficient are specified, based on their location relative to the previous selected coefficient. As shown in FIG. 5, in transformed block $112_n$, six AC coefficients are selected. These are the second, fifth, sixteenth, seventeenth, twenty-fourth and fortieth along the zig-zag path, not counting the DC coefficient. One way to encode this, is to transmit a digital codeword that signifies the number of non-selected coefficients between selected coefficients (and thus the locations of the selected coefficient), along with a stream of codewords that signify the quantized amplitudes of the selected coefficients.

For instance, in FIG. 5, an intermediate codestring that signifies the number of non-selected coefficients between selected coefficients would be 1,2,10,0,6,15,23 (or, more typically, "end of block"). Starting with the DC coefficient as an origin, before the first selected coefficient (the second in the string) is one. The number of intervening non-selected coefficients between the first selected coefficient and the second (the fifth in the string) is two. The number between the second and the third (the sixteenth) is ten. The number between the third and the fourth (the seventeenth) is zero, and so-on. After the last selected coefficient, twenty-three non-selected coefficients arise before the end of the block. It is possible to signify this run of twenty three non-selected coefficients with the codeword "23". Alternatively, and more efficiently, a special codeword is allotted for the end of the block, to signify that the rest of the coefficients (after the sixth selected coefficient) are non-selected. (Another method, rather than counting the number of intervening non-selected coefficients, is to specify the location of the next selected coefficient. Both methods amount to basically the same thing.)

This intermediate codestring (1,2,10,0,6,15, end of block) must be digitally represented, typically simply by coding in binary for each runlength. The shortest possible runlength is zero and the longest possible runlength is sixty-three, so according to the simplest scheme, six bits are necessary to specify each runlength. Other schemes, using a variable length codeword to specify each runlength are known as "entropy" coding, and are discussed below.

The foregoing coding only codes for the positions of the selected coefficients along the zig-zag path. It is also necessary to code the amplitudes of the coefficients. (The invention only relates specifically to coding the location information.) Typically, the information that identifies the locations of the selected coefficients takes up more than one-half of the data that must be transmitted. As has been mentioned, for instance in the special case of uniform codewords discussed above, the amplitudes of the coefficients have been quantized into codewords of uniform word length, in the case discussed, 8 bits. Thus, according to one technique, if the first codewords to be sent are those which code for the position (and quantity) of the selected coefficients, a second stream of codewords can be sent for the amplitudes. Thus, in a most rudimentary method, for the example shown in FIG. 5, it would be necessary to send seven codewords for the locations (including one for "end of block") and six codewords for the amplitudes, for a total of thirteen codewords.

In entropy coding, an advantage is gained from recognition of the fact that in typical images, the probability that a certain length of run will arise varies, depending on the length. For instance, a run of sixty-two is very common, signifying a single selected coefficient in the first position, with all other coefficients being non-selected. Similarly, other long runs are more likely than runs of moderate length, such as thirty-three. Runs of very short length, e.g. zero, one and two, are also highly likely, because selected coefficients tend to be clustered at the beginning of the zig-zag pattern. Thus, in entropy coding, an estimation is made of the probability that a certain value, in this case a runlength, will be the value that is desired to be coded, and the values are ordered according to probability, from highest to lowest. Next, a set of codewords (also known as a "codebook") is developed with codewords of different lengths (number of bits). The codewords having the shortest lengths are assigned to the runlengths of highest probability, and the codewords of longer lengths are assigned to the runlengths of lesser probability. Thus, it will typically take fewer bits to specify a series of runs, because the most probable runs are specified with the shortest codewords.

One complication of entropy, or variable length codeword coding arises from the fact that the codewords are not all the same length. The decoder must have some way of identifying when in a stream of "1"s and "0"s one codeword ends and the next begins. When all of the codewords are the same length, the decoder simply starts analyzing a codeword at the end of a fixed number of bits. Several techniques for variable length coding are practiced. Typical are Huffman coding and arithmetic coding. Huffman coding is discussed in detail in Lim, J. S., *Two-Dimensional Signal and Image Processing*, Prentice Hall, Englewood Cliffs, N.J. (1990), pp. 613–616, and Huffman, D. A., "A method for the construction of minimum redundancy codes," *Proceedings IRE*, vol. 40, 1962, pp. 1098–1101, both of which are incorporated herein by reference. Arithmetic coding is discussed at Pennebaker, W.B., Mitchell, J. L., et al., "Arithmetic coding articles," *IBM J. Res. Dev.* 32, 6

Special Issue (Nov. 1988), 717–774, which is incorporated herein by reference. Only Huffman coding is discussed herein, and that only cursorily.

According to a Huffman coding scheme, a codebook is established such that as a stream of bits is analyzed, it is unambiguous when a codeword has been completed. For instance, a typical stream of bits could be 100011011101011111. The codebook from which this stream of code was constructed is shown schematically in FIG. 6b. For explanatory purposes, this codebook is very small, including only six entries. However, it must be understood that the codewords listed are the entire set of codewords for this codebook. In other words, neither 1, 111, nor 10 are valid codewords. Thus, analyzing the string of bits, from left to right, the first bit is "1", which is not a codeword. Combining the next bit to have "10", is still not a valid codeword. Combining the next bit produces "100", which is a valid codeword, signifying the runlength of 1. Starting over again, the next bit is "0", which is a valid codeword and signifies a runlength of 0. Starting over again, the next bit is 1, not a valid codeword, followed by another 1, producing "11", still not a valid codeword. Appending the next "0" produces "110", the codeword for a run of length 2. Applying the same process for the rest of the string shows that the order of the runlengths was 1, 0, 2, 4, 3, 5.

Use of Huffman coding will result in codewords of very long lengths, for those very rare runlengths. If the table is properly constructed, however, it will result in the use of short codewords most often. Huffman coding requires that the probabilities of various runlengths be known, or at least estimated to some reasonable certainty. It also requires the storage of the codebook and accessibility to it by both the encoder 126 and decoder 136, which is not required if the codebook is simply the digital representation of the runlength, as set forth in FIG. 6a. In that case, no codebook per se is necessary, although it is still necessary to provide instructions for both the encoder and the decoder to use that sort of a coding scheme.

Analysis of the runlength method of encoding the location of selected coefficients reveals that it is highly efficient when the length of the runs are long, and it is only necessary to specify the location of a few coefficients. However, when the lengths of runs are short, and it is necessary to specify the location of relatively many coefficients, runlength encoding is not very efficient, since both the location and the amplitudes must be specified for many values. Additionally, for large blocks, such as an 8×8 block, there is a significant difference in the probability that a certain run will arise beginning on the second coefficient, as compared to beginning on the thirtieth component. For instance, the probability that any runs of longer than thirty-four will start on the thirtieth coefficient is zero, however, the typical Huffman coding does not take this into account, and allocates the shorter codewords to those runlengths having the highest probability of starting at a coefficient near to the low frequency region of the block.

Another method of encoding the locations of selected coefficients is also used. This method is not used in conjunction with run-length coding. This method is known as "vector quantization," because it treats the representation of the transform block $112_n$ shown in FIG. 5 as a two-dimensional vector. Rather than specifying the differences between locations of selected coefficients, vector quantization specifies the pattern of selected coefficients. Each possible pattern is given a unique codeword. The actual pattern is matched to a list of patterns, and the codeword is transmitted.

For instance, as shown in FIG. 7a, the pattern of selected coefficients is different from the pattern set forth in FIG. 5. Similarly, the pattern in FIG. 7b differs from both. For an 8×8 block, there are $2^{64}$ or approximately $1.8 \times 10^{19}$ different patterns, a very large number. It is possible, although burdensome, to specify all of the possible patterns in the codebook, as shown schematically in FIG. 8, and to assign to each of the $2^{64}$ patterns a unique 64 bit codeword. Thus, to transmit the coded patterns only requires sending a single, in this case 64 bit codeword, rather than the several codewords typically necessary to specify a pattern using runlength coding. Independent of how many selected coefficients there are, there will be only a single codeword transmitted to specify their pattern, and thus their location. This is an equivalent method to giving one bit to each coefficient, just to indicate if the amplitude of that coefficient is non-zero or not. The codebook must be stored and accessible to both the encoder 126 and the decoder 136. The amount of memory required to store the codebook is very large, given the large number of patterns and the high number of bits necessary to code each pattern.

As in the case of runlength coding, it is possible, and more typical, to use a variable length codeword codebook, rather than the uniform codeword length book shown schematically in FIG. 8. In that case, the probability of different patterns is determined, or estimated, and patterns of highest probability receive codewords using the least number of bits. Thus, to specify highly probable patterns, a codeword of only a few bits must be sent, rather than the 64 bits of a uniform length codeword system, or the number required by runlength encoding. It will also be understood that because some possible strings of bits will not be valid codewords, due to the necessity to specify the boundaries between codewords of variable lengths, the codewords for the least probable patterns will require many more than 64 bits, for example, perhaps as many as 160.

Thus, although vector quantization may result in a very efficient coding of most patterns, it requires a very large table to be generated and stored to have the capability of encoding all patterns, thus requiring that the apparatus have a very large amount of memory and computations, impractical for many situations.

It is possible to break up the 8×8 coefficients into several segments, but this results in a loss of efficiency because dividing the block into regions makes it difficult to exploit the correlation between regions.

Thus, the several objects of the invention include to provide a method and an apparatus for the encoding of one-dimensional and multi-dimensional signals, including the position within a block of selected coefficients, such as transform coefficients: which does not require an inordinately high amount of memory for the storage of codewords, which facilitates codewords of a relatively small bit rate; which facilitates assigning different codewords to the same runlength depending on the location of the starting coefficient of the run; which is more efficient in terms of bits used per coefficient than runlength encoding; which requires less computation and less use of memory than vector quantization; and which can be implemented straightforwardly.

BRIEF DESCRIPTION OF THE INVENTION

In a broad embodiment, the method of the invention is a method of encoding location information pertaining to a source position signal characterized by positions of a set of selected coefficients, ordered in at least one dimension, there being a generally expected pattern of selected coefficients in said position signal with respect to the type of source signal, said method comprising the steps: for a first component of said position signal, generating a signal encoding the locations of said selected coefficients by a method that has a relatively high efficiency with respect to the generally expected pattern of selected coefficients in said first component; and for a second component of said position signal, generating a signal encoding the locations of said selected coefficients by a method that has a relatively high efficiency with respect to the generally expected pattern of selected coefficients in said second component.

A second preferred embodiment of the method of the invention is a method of encoding location information pertaining to a source position signal characterized by positions of a set of selected coefficients, ordered in at least one dimension, said method comprising the steps of: generating a signal encoding the locations of said selected coefficients by runlength encoding, comprising the steps of: for a first run segment of said position signal, generating a signal encoding the locations of said selected coefficients using a first codebook; and for at least one additional segment of said position signal, generating a signal encoding the locations of said selected coefficients using at least one additional codebook.

A third preferred embodiment of the invention is a method of decoding a signal encoding a source position signal characterized by positions of a set of selected coefficients, ordered in at least one dimension, said encoding signal having been generated by the steps of: for a first component of said position signal, generating a signal encoding the locations of said selected coefficients by vector quantization; and for a second component of said position signal, generating a signal encoding the locations of said selected coefficients by runlength encoding; said method of decoding comprising the steps of: decoding said signal encoding the locations of said selected coefficients that was generated by runlength encoding; and decoding said signal encoding the locations of said selected coefficients that was generated by vector quantization.

A fourth preferred embodiment of the method of the invention is a method of encoding a source position signal characterized by positions of a set of selected coefficients, ordered in at least one dimension, said method comprising the steps of: for a first component of said position signal, generating a signal encoding the locations of said selected coefficients by vector quantization; and for a second component of said position signal, generating a signal encoding the locations of said selected coefficients by runlength encoding.

A preferred embodiment of the apparatus of the invention is an apparatus for encoding information pertaining to a source position signal characterized by positions of a set of selected coefficients, ordered in at least one dimension, said apparatus comprising: a runlength encoder for encoding the locations of said selected coefficients; and connected to said runlength encoder: first codebook memory for encoding the locations of said selected coefficients in a first run segment of said position signal; and at least one additional codebook memory for encoding the locations of said selected coefficients in at least one additional run segment of said position signal.

A second preferred embodiment of the apparatus of the invention is an apparatus for encoding information pertaining to a source position signal characterized by positions of a set of selected coefficients, ordered in at least one dimension, said apparatus comprising: a vector quantizer for encoding the locations of said selected coefficients in a first component of said position signal; and a runlength encoder for encoding the locations of said selected coefficients in a second component of said position signal.

A third preferred embodiment of the apparatus of the invention is an apparatus for decoding a signal encoding a source signal characterized by positions of a set of selected coefficients, ordered in at least one dimension, said encoding signal having been generated by the steps of: for a first component of said position signal, encoding the locations of said selected coefficients by vector quantization; and for a second component of said position signal, encoding the locations of said selected coefficients by runlength encoding; said decoding apparatus comprising: means for decoding said signal encoding the locations of said selected coefficients that was generated by runlength encoding; and means for decoding said signal encoding the locations of said selected coefficients that was generated by vector quantization.

BRIEF DESCRIPTION OF THE FIGURES

FIG. 4 shows schematically a zig-zag path through a block of transform coefficients by which runlength encoding of coefficients is typically conducted.

FIG. 5 shows schematically a block of transform coefficients, with selected coefficients indicated by dark squares, and non-selected coefficients indicated in white.

FIG. 6a shows schematically a portion of a codebook used in runlength coding, with all codewords of equal length.

FIG. 6b shows schematically a codebook used in runlength coding, with codewords of variable length.

FIG. 7b shows schematically a block of transform coefficients, with selected coefficients indicated by dark squares, and non-selected coefficients indicated in white, these coefficient locations differing from those shown in FIGS. 5 or 7a.

FIG. 9b shows schematically a block of transform coefficients also encoded by both vector quantization and runlength encoding, with a different boundary between the regions of different coding, as compared to the block shown in FIG. 9a.

DETAILED DESCRIPTION OF PREFERRED EMBODIMENTS OF THE INVENTION

One aspect of the invention takes advantage of the realization that for coding methods in which it is necessary to encode the location of transform coefficients with respect to some ordering, such as transform coding, runlength encoding and vector quantization are desirable for mutually exclusive types of patterns of selected coefficients. Runlength coding is efficient for patterns having long runs of non-selected coefficients, but is not very efficient for coding patterns having a significant fraction of selected coefficients. Vector quantization is undesirable for coding a large number of possible patterns, due to the large memory requirements. However, it is desirable for coding a relatively small number of possible patterns, since, with entropy coding, each pattern, and thus the location of every selected coefficient, can be specified with a relatively small number of bits. Vector quantization, is not sensitive to whether there are many, or few selected coefficients.

Figure 13A:
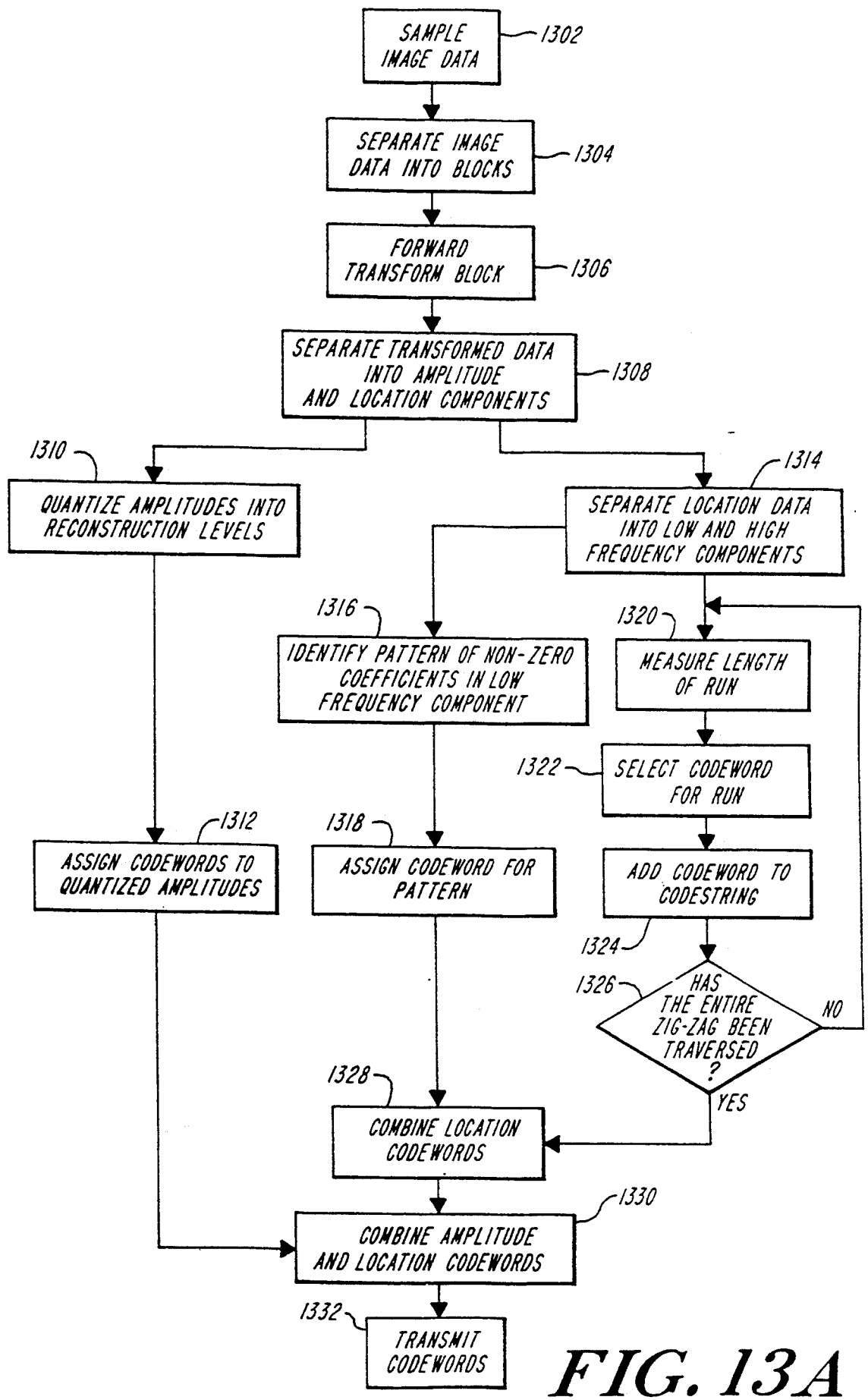
FIGS. 13a and b show schematically a preferred embodiment of the method of the invention using combined runlength encoding and vector quantization, with FIG. 13a showing the encoder portion and FIG. 13b showing the decoder portion.
Figure 13B:
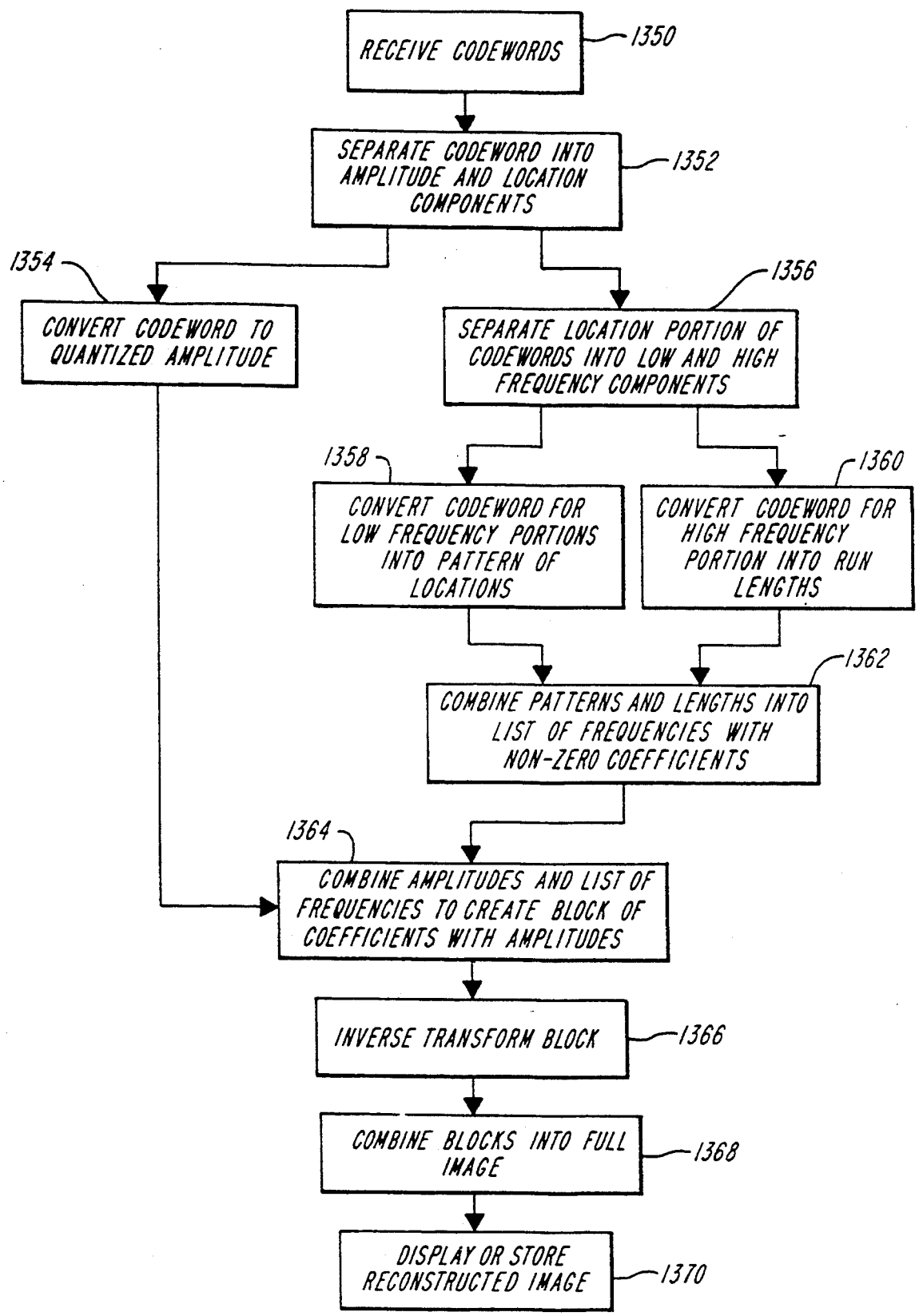

The overall method of a preferred embodiment of the invention is shown schematically in FIGS. 13a and 13b, with FIG. 13a showing the encoder portion of the invention and FIG. 13b showing the decoder portion. As in the prior art, image data is sampled at 1302, typically in the form of pixels across a horizontal line, with many horizontal lines arranged vertically. The sampled data is separated into blocks, for instance into blocks of $8 \times 8$ pixels at 1304. A forward transform, for instance a DCT type transform, is applied at 1306. The method of the invention is applicable to virtually any type of transform, and is not limited to DCT type transforms. Typically it applies to linear transformations, but also applies to any type of transformation that involves noting location-type information. The transformed data is in the form of a two-dimensional spectrum of coefficients, each having a continuous amplitude (some of which are small) and a location in the spectrum, also referred to herein as a "transform block". By continuous amplitude, it is meant that the amplitude can be of any value, and has not yet been "quantized" into discrete, quantized levels.

The method of the invention typically operates on the amplitude information separately from the location information. These two types of information are separated at 1308. This separation can be conducted according to means well known to the art. The continuous amplitude information is quantized at 1310 into reconstruction levels according to means well known in the art. A codeword is assigned at 1312 to each quantized amplitude.

Figure 1:
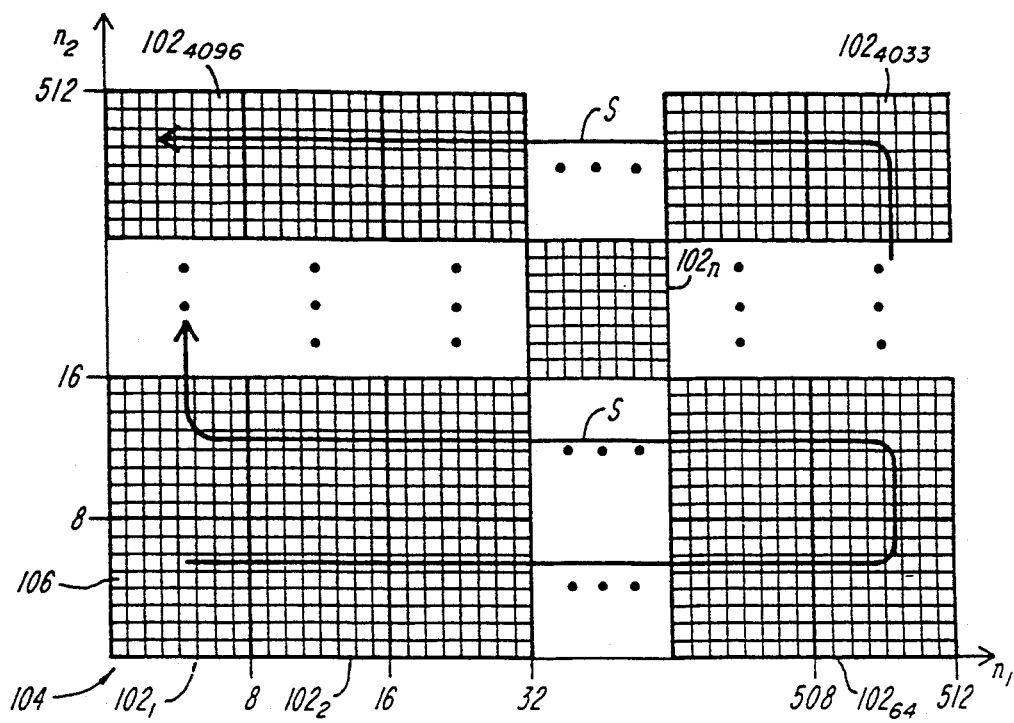
FIG. 1 shows schematically a path by which a two dimensional image is sampled into blocks of pixels, and a path by which the blocks are ordered
Figure 3:
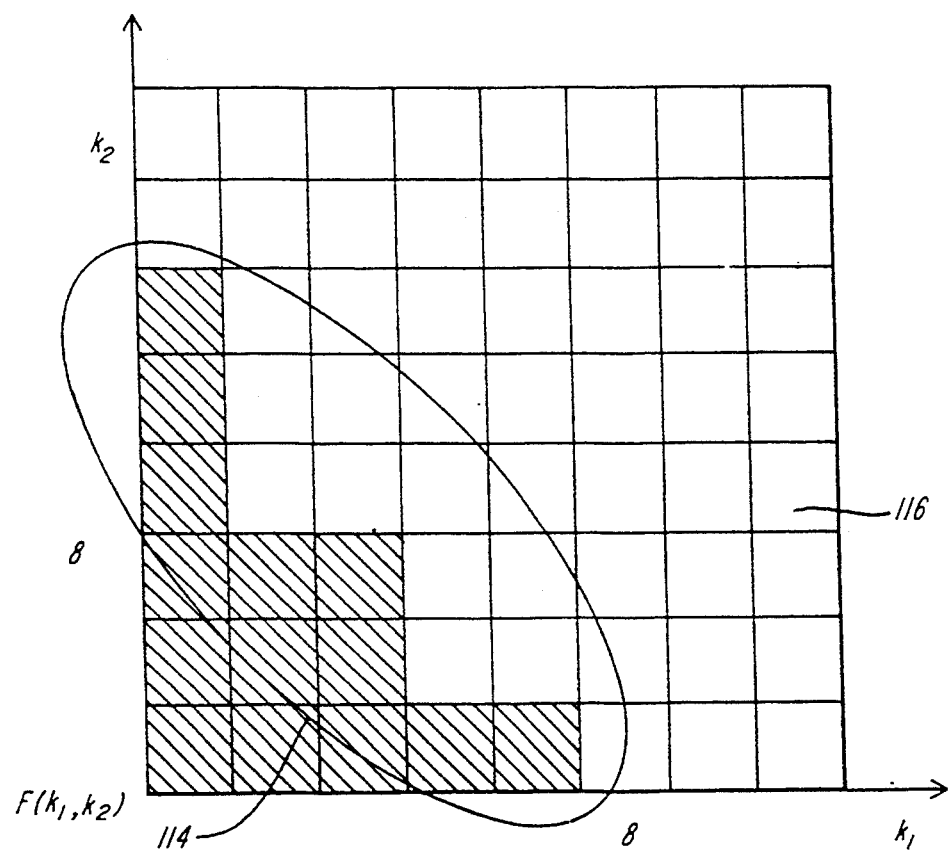
FIG. 3 shows schematically coefficients for a block of transformed data representing a block of a two dimensional image of FIG. 1, with large amplitude "selected" coefficients indicated by shading, and small amplitude ("non-selected") coefficients indicated in white.
Figure 2:
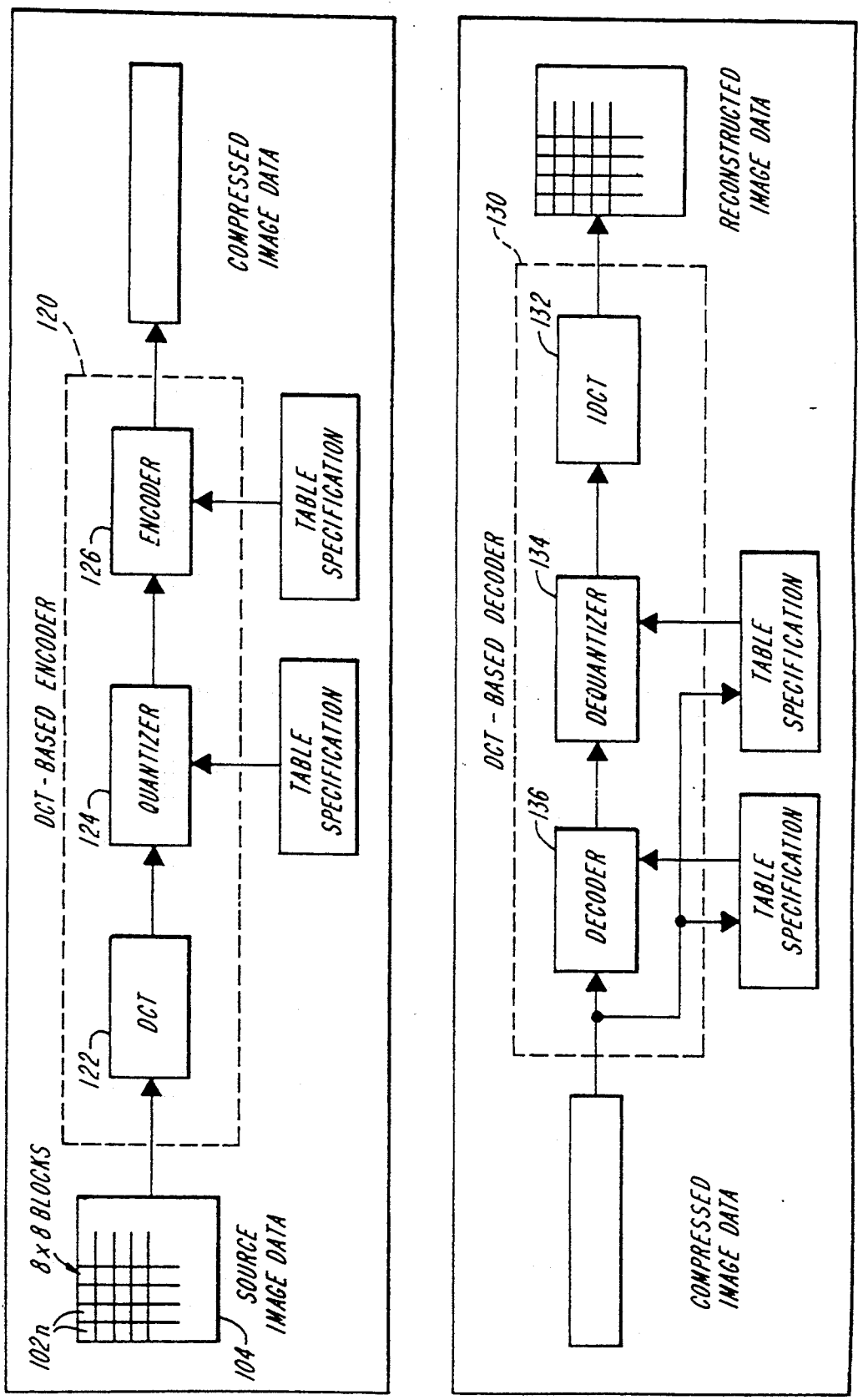
FIG. 2 shows schematically an apparatus of the prior art for digitally encoding a two dimensional source image, and for decoding the coded data to produce a reconstructed image.
Figure 7A:
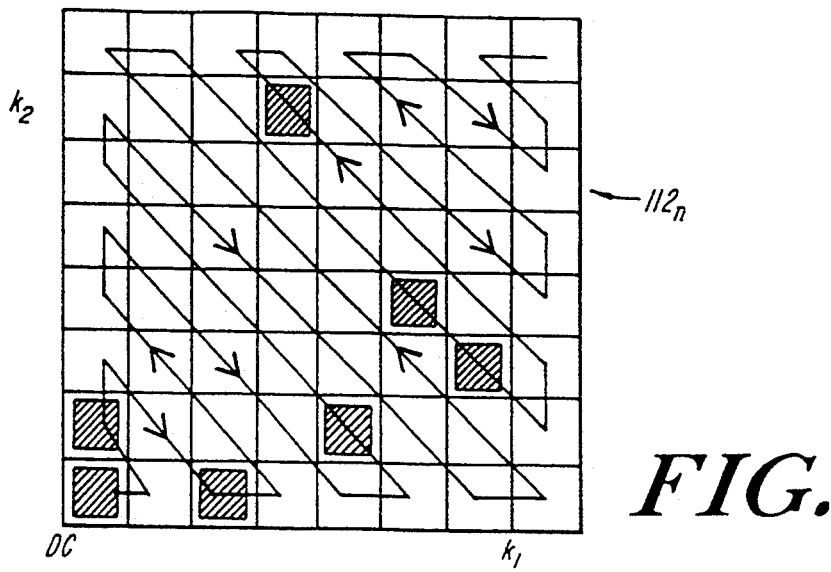
FIG. 7a shows schematically a block of transform coefficients, with selected coefficients indicated by dark squares, and non-selected coefficients indicated in white, these coefficient locations differing from those shown in FIG. 5.
Figure 7B:
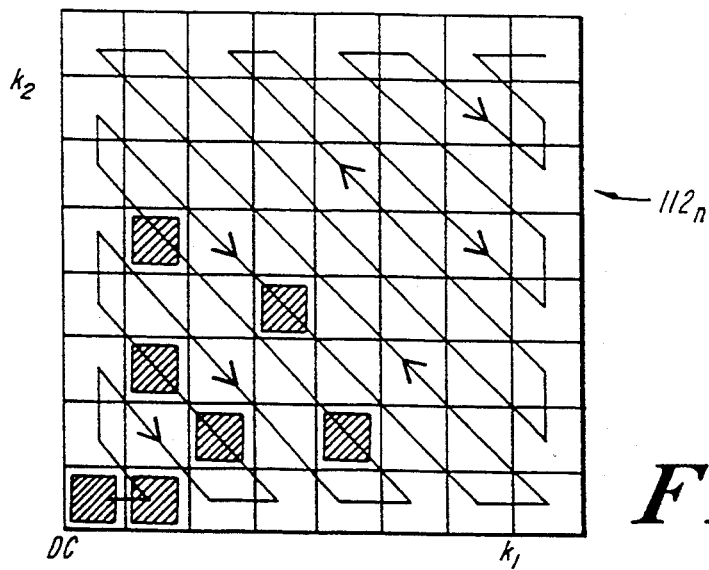
Figure 9A:
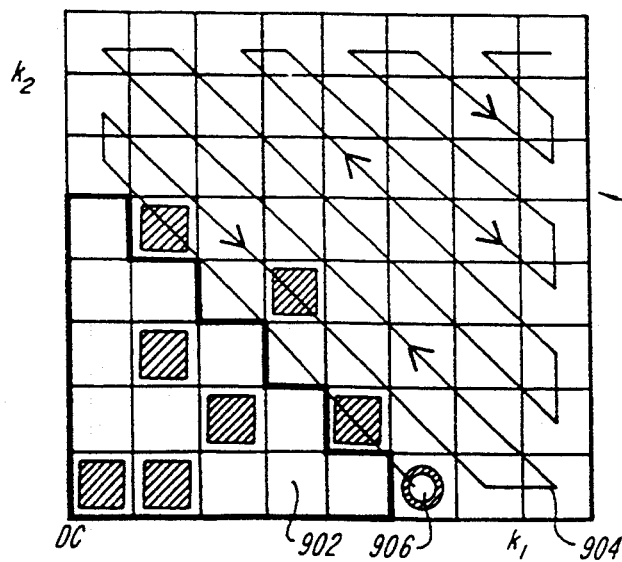
FIG. 9a shows schematically a block of transform coefficients, indicating that the locations of a first subset of transform coefficients is encoded according to the method of the invention using vector quantization, while the locations of a second subset is encoded using runlength encoding.

FIG. 9a shows schematically a block $112_n$ of coefficients of a transformed block of image data $102_n$. In accordance with the present invention, the block $112_n$ is separated at step 1314 into two regions, 902 and 904. Region 902 is enclosed by a heavy dark border in FIG. 9a, and includes generally the DC coefficient and, in this example, the fourteen lowest spatial frequency coefficients. Region 904 includes the remaining, higher frequency coefficients of the block $112_n$. According to a first preferred embodiment of the method of the invention, coding of the locations of the selected coefficients is conducted by means of two methods: region 902 is coded by a vector quantization and region 904 is coded by a runlength encoding.

Coding of region 902 follows the general method of vector quantization. The pattern of selected coefficients is identified at 1316 and is matched to a pattern in a codebook. Region 902 includes fourteen AC coefficients. Therefore, the total number of patterns of selected coefficients is $2^{14}$, or 40,768 possible patterns. While this is a large number of possible patterns, storage of such a number of relationships in the codebook is well within the scope of practical hardware capabilities. For instance, to store this many patterns, with each pattern requiring, on average, five bits, the total of $5 \times 2^{14}$ or so bits of storage is very feasible.

Figure 8:
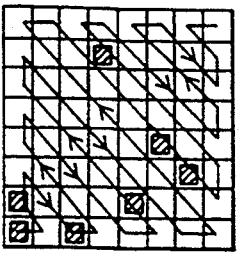
FIG. 8 shows schematically a portion of a codebook used in vector quantization encoding, using codewords of constant length.
Figure 8:
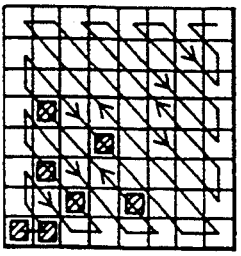
Figure 8:
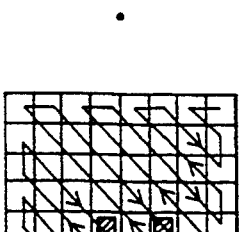

As in the prior art, a codeword for the pattern is assigned at 1318 either by a fixed length codeword as shown in FIG. 8, or by entropy coding, which typically provides more efficient results. If fixed coding were applied, the codeword would be fourteen bits. If entropy coding were used, codewords for the highly likely patterns could be as short as a single bit, while codewords for less likely patterns could be as long as thirty of forty bits, depending upon the entropy coding technique chosen. Typically, entropy coding would be chosen if experience showed that for the type of image, some patterns arose with a significantly higher probability than others.

Coding of region 904 follows the general method of runlength coding. Region 904 includes forty-nine AC coefficients. Runlength encoding begins with the origin at the coefficient 906, indicated by a heavy circle. The length of the first run is measured at 1320. A convention may be assigned, such as to measure runs as if the preceding run terminated on the last AC coefficient in the vector quantization region 902. Thus, in the example shown in FIG. 9a, the length of the first run would be one, since only one selected coefficient is in this run. At 1322, an intermediate codeword is assigned signifying the run. For instance, the codeword "1" could be appropriately assigned. At 1324, the codeword for the first run is added to a codestring signifying all of the runs in the path. Since this is the first run, it is the first codeword.

At 1326, a condition is examined to determine if the entire zig-zag path has been traversed. If not, the method returns to 1320 and measures the length of the next run. Only three coefficients (the second, fifth and tenth) indicate selected coefficients. The length of the second run is two, and the length of the third run is four. A typical codeword for this run would be a binary translation of the sequence "1,2,4" according to the techniques discussed above, using either fixed length codewords, or, more beneficially, variable length codewords. At 1326, if at 1322 the codeword assigned is the codeword that indicates the end of the run, then the entire zig-zag pattern has been traversed, and at 1326 the method of the invention would proceed to step 1328 where the location codewords are combined.

Figure 9B:
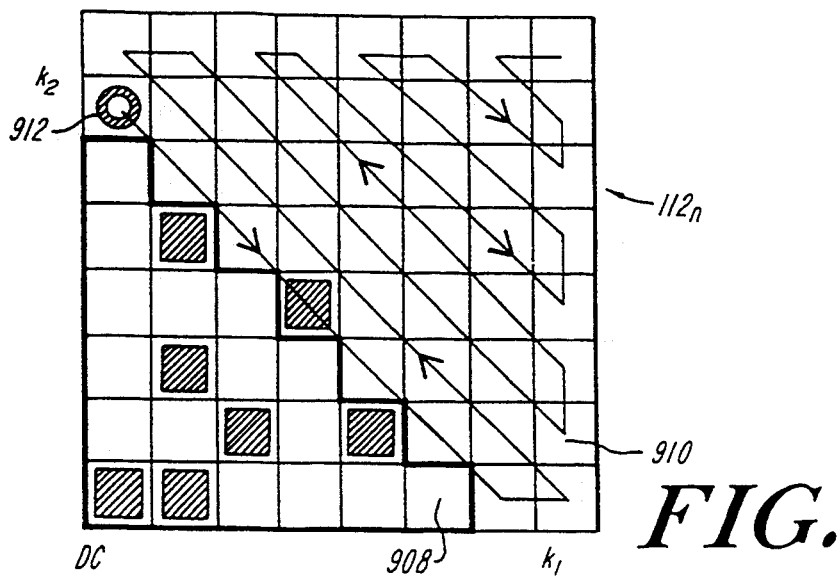

According to the method of the invention, rather than applying vector quantization to only the first fourteen AC coefficients as shown in FIG. 9a, vector quantization could be applied to a different number of coefficients, such as the first twenty coefficients, as shown schematically in FIG. 9b. Region 908 is coded by vector quantization and region 910 is coded by runlength encoding, starting with coefficient 912 as the origin.

For the vector quantization portion, all is the same as in the example of FIG. 9a, except that $2^{20}$ patterns must be encoded, and thus the codebook will have $2^{20}$ entries in it, rather than only $2^{14}$, as discussed above. Either fixed length codewords or entropy based coding can be employed.

For the runlength encoding, encoding proceeds as in the example of FIG. 9a. However, fewer coefficients are selected, and thus, there will be fewer runs. Further, because the maximum runlength starting at the twenty-first coefficient 912 is only forty-three, rather than forty-nine or sixty-three, there need be fewer entries in the codebook. This savings is only significant if entropy coding is used. If fixed length codewords are used, the lengths of the codewords used in FIGS. 9b and 9a (and the prior art, for that matter) will be the same, and the memory saved from having six fewer codewords in the codebook is negligible.

After the entire path has been traversed and codewords have been assigned to specify the runlengths, the runlength information and the vector quantization information is combined at 1328 to completely specify the locations of the selected coefficients. At 1330, the combined location coding information is further combined with the amplitude coding information generated at step 1312, thus fully specifying the amplitudes and locations of transform block $112_n$. The specific means by which the location information is combined at 1328 and by which the amplitude and location information is combined at 1330 is not important to the invention. The combination at 1330 can place either portion first in a string, or can interleave the runlength information with the amplitude information block by block. In fact, there need be no combination at all any more complicated than one type of information being transmitted sequentially following another type of information as long as some separation technique is used. This separation can be accomplished by well known methods, such as placing a punctuation code between components. All that is required is that the decoding components of the apparatus that implements the method of the invention have a means of identifying which portion of the data stream is amplitude information, which is pattern information, and which is runlength information. At 1332, the suitably combined codeword information is transmitted along a suitably chosen channel.

The receiving portion of a preferred embodiment of the method of the invention is shown schematically at FIG. 13b. The codewords for a single transform block, as discussed above, are received at 1350. The amplitude components of the codewords are separated from the location components at 1352. The means of separation depends on the means of combination, if any, used at step 1330. At 1354, the codewords representing amplitudes are converted into a series of quantized amplitudes, simply by matching the codewords to the quantization levels in an amplitude codebook.

The pattern and runlength (low and high frequency) portions of the location codewords are separated at 1356. This step may take place simultaneously with step quantization step 1354, or may be implemented either before or after step 1354. A parallel embodiment is shown in FIG. 12b. The pattern codeword is converted into a pattern of locations at 1358 with reference to a codebook that is inversely related to the codebook used at step 1318 to assign pattern codewords. Simultaneously (or subsequently), the runlength codewords are converted into runlengths at 1360 with reference to a codebook that is inversely related to the codebook used to code for the runlengths at step 1322. The location information is combined with the amplitude information at 1364, possibly after the pattern information and the runlength information is itself combined at 1362, depending upon whether this location information was combined in the coding portion of the operation. The result of combining the amplitude information with the location information is a transform block similar to the block $112_n$ from which the data was originally translated. The difference will be that the amplitudes in the original block $112_n$ were continuous, while the amplitudes in the coded and decoded transform block are all quantized, i.e. are all in discrete reconstruction levels, with no amplitudes lying between reconstruction levels.

The transmitted and reconstructed transform block inverse transformed at 1366 to undo the effects of the forward transformation at 1306 in the coding phase. The inverse transform must be matched to the forward transform, such as an IDCT as discussed above. The result of the inverse transformation is a block of intensities, such as grayscale intensities, arranged in the data space of the original image, which is typically simply a spatial two-dimensional image space.

Each $8 \times 8$ pixel block of the original image is subjected to the above coding, transmission and decoding. At 1368 the inverse transformed blocks are all combined into a full image in the typically spatial data space of the original image. If desired, the image is displayed at 1370.

Figure 14A:
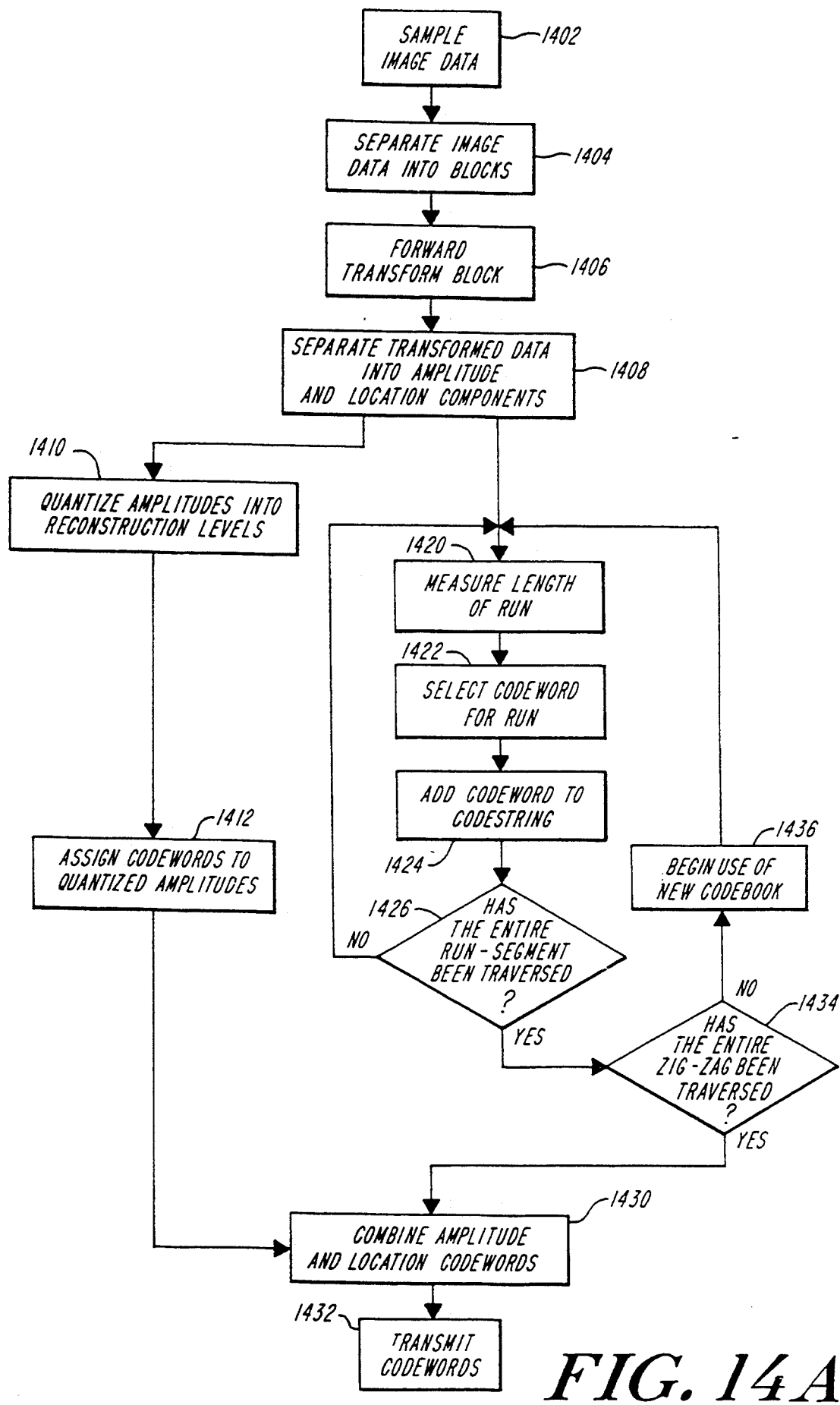
FIGS. 14a and b show schematically a preferred embodiment of the method of the invention using multiple codebooks, with FIG. 14a showing the encoder portion and FIG. 14b showing the decoder portion.
Figure 14B:
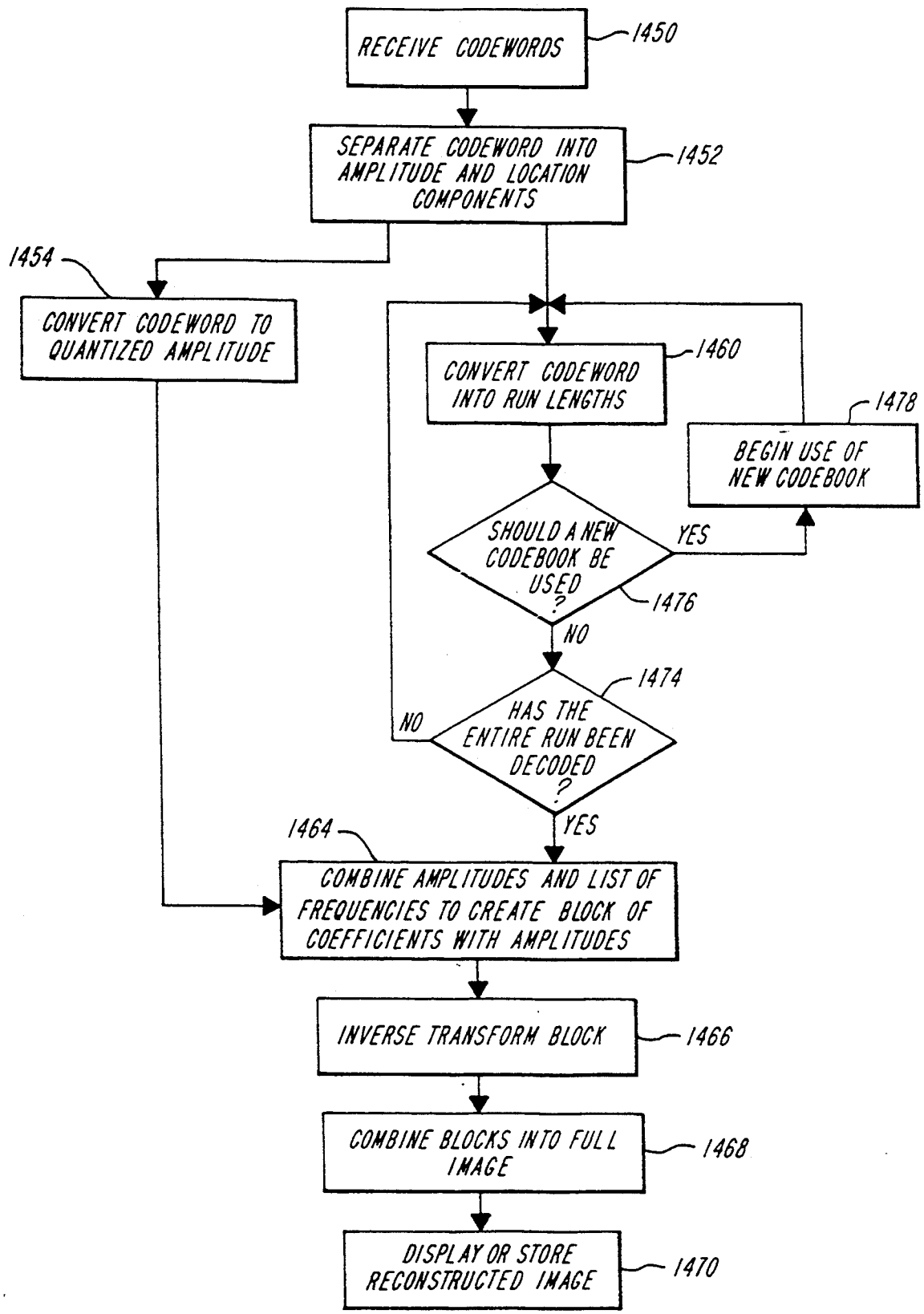

According to a second and very significant embodiment of the invention Shown in FIGS. 14a and 14b, the efficiency of runlength coding is enhanced by using a different codebook for different runs at step 1422 (and at step 1460), depending upon the location of the previous selected coefficient. This aspect of the method of the invention may be referred to as adaptive runlength coding. FIGS. 14a and 14b shows an embodiment of the invention that may be implemented using only runlength encoding. The steps shown are the same, in general, as the runlength encoding steps discussed with reference to FIGS. 13a and 13b, with like steps being identified with reference numerals beginning with "14" rather than "13". In known runlength coding methods, only a single codebook is used at step 1422 to assign codewords to runlengths along the entire traversal of the zig-zag path. (The corresponding inverse of that codebook would be used at step 1460 according to the prior art.) However, the probability that certain lengths of runs will arise changes dramatically along the path. In the most dramatic case, which arises quite often in the case of a single selected coefficient as the first AC coefficient of the path, the run of sixty-two is impossible after the second coefficient has been traversed. For instance, a codebook based only on a run of 62 as being the maximum run is not very efficient for runs whose maximum possibility is only 15, because they start relatively close to the end of the block. This principal applies to other runs of length=RL which become impossible after the requisite number of coefficients have been traversed, e.g., for a sixty-four coefficient block $112_n$, after 64−RL coefficients have been coded.

Figure 10A:
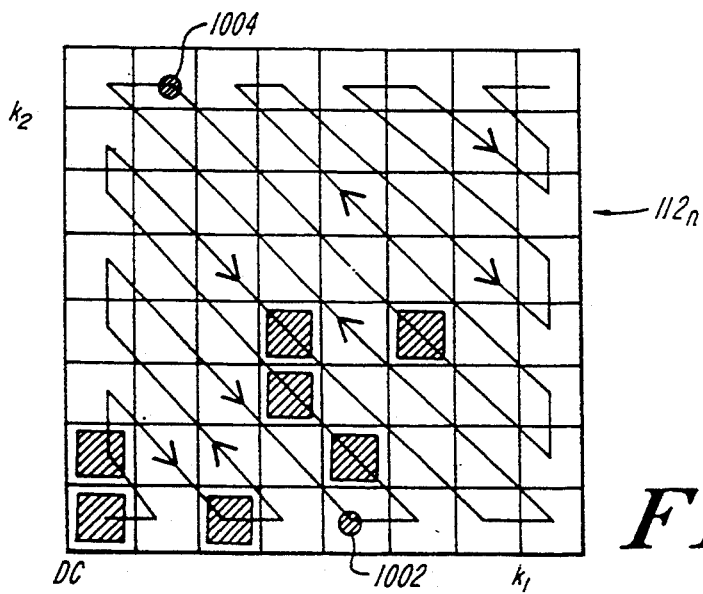
FIG. 10a shows schematically a block of transform coefficients to be encoded by runlength encoding, indicating runlength segments for practice of the method of the invention using different codebooks for different run segments of the block, depending on the location of the beginning of the run.

One aspect of the method of the invention minimizes this waste by using different codebooks at step 1422 (and different inverse codebooks at step 1460), depending on the location of the previous selected coefficient, i.e. the anchor for that portion of the run. For instance, as shown in FIG. 10a, the example used in FIG. 5 is shown. However, the run is divided into three run-segments. The first codebook is used beginning at the DC coefficient, and traverses the first fourteen coefficients, ending at the fourteenth AC coefficient, indicated with a dark circle 1002. The second codebook is used beginning at the coefficient following coefficient 1002, and traverses the next twenty-two coefficients, ending at the thirty-sixth AC coefficient 1004. The third codebook is used beginning at the coefficient following coefficient 1004 and continues to the last coefficient.

Figure 11:
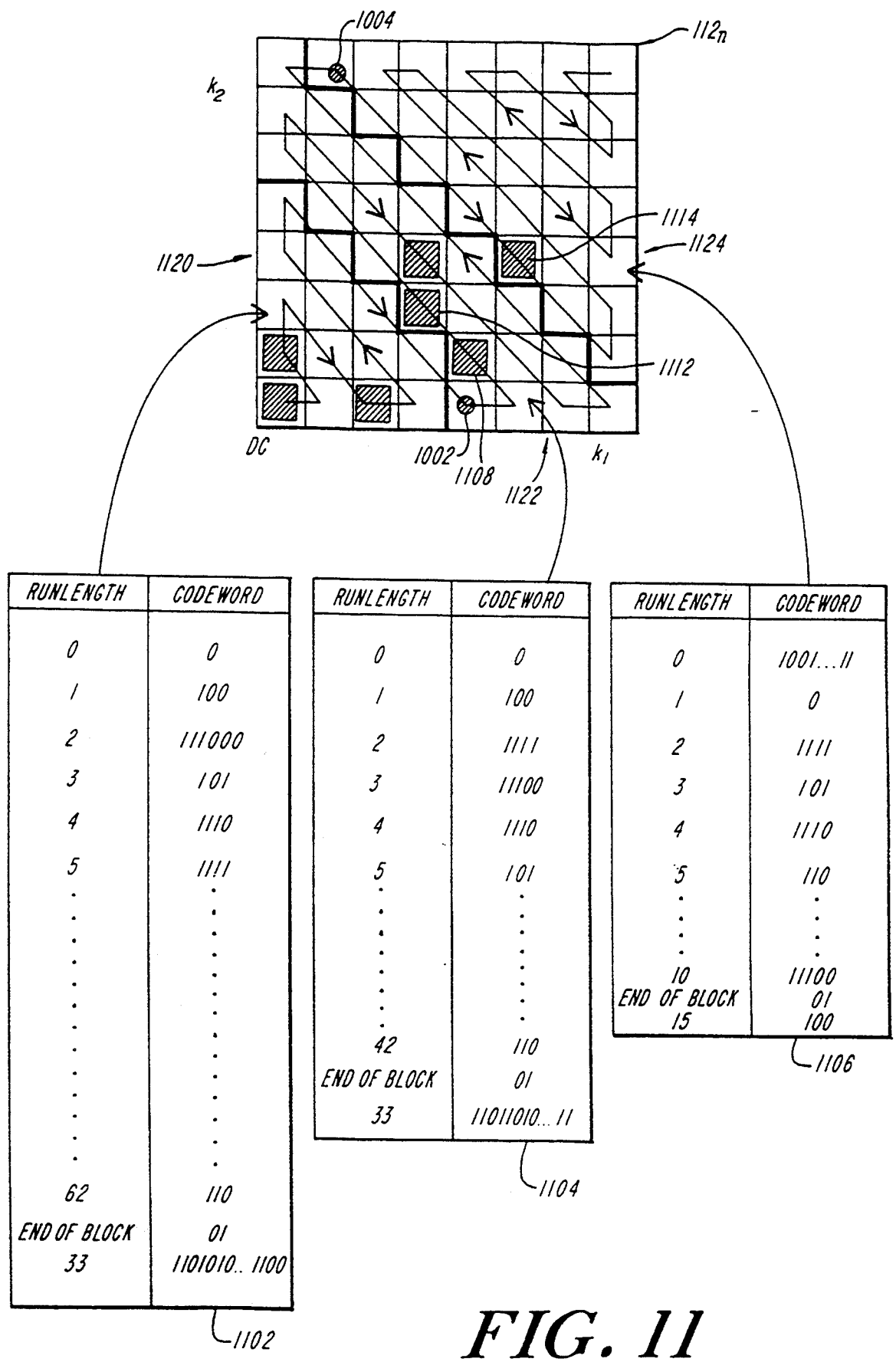
FIG. 11 shows schematically the composition of different codebooks for different run segments of a transform block coded entirely using runlength coding.

Composition of the respective codebooks for the three segments is shown schematically in FIG. 11. The transform block $112_n$ is divided into three run segments 1120, 1122 and 1124, as in FIG. 10a. A first codebook, 1102 is provided, having sixty-three entries for use in conjunction with runs beginning in run segment 1120. The runlengths that are most likely to arise when the beginning or anchor of a particular run falls in run segment 1120 are assigned codewords having relatively few bits, while the unlikely runs are assigned codewords having relatively many bits. (The codebooks shown in FIG. 11 are for explanatory purposes only, and do not reflect actual probabilities, or proper entropy codings.) The least likely runlength may be assigned a codeword having many more than 64 bits, for instance, 160 bits.

As the zig-zag pattern is traversed, codewords are assigned from codebook 1102 for runs of length one, two and ten. The code for the run that terminates at coefficient 1108 is derived from the first codebook 1102, since that run began in the first run segment at the sixth AC coefficient. The probability that a run will be of a certain length is based upon the location of the coefficient that begins the run.

The run that terminates at coefficient 1112 is of length zero and thus is considered also to have begun immediately preceding coefficient 1112, which falls within the second run segment 1122. Thus, at step 1426, the method of the invention would determine that the entire first run-segment 1120 had been traversed, and, rather than returning to step 1420 to measure the length of the next run, it would proceed to step 1434 to determine if the entire zig-zag had been traversed. Because it has not, the method would proceed to step 1436, where the use of a new codebook, in this case codebook 1104 would be initiated. The method then returns to step 1420 and measures the length of the run.

To assign a codeword to this run of length zero, the apparatus conducting the method of the invention refers at step 1422 (FIG. 13a) to the second codebook 1104. This codebook is constructed in the same manner as the codebook 1102, except that it has fewer entries (fifty rather than sixty-three) and the codewords are assigned based on the probability that a run of a certain length will occur in the final fifty coefficients, rather than the probability of a run of such length occurring over the entire block. Since there are fewer entries, the longest codewords need be of fewer bits than the longest codewords of codebook 1102. In addition, the codebook design is based on different and more appropriate probabilities than was the codebook 1102, thus making it more efficient for the portion of the runs to which it is applied. This economizes on the number of bits that must be transmitted to specify runs, particularly unlikely runs. Although in the example shown, runs of length zero are assigned the codeword "0" in both of codebooks 1102 and 1104, this is not necessary and will typically not be the case.

Similarly, when the run that begins at the coefficient after coefficient 1114 is measured and coded, use of codebook 1106 is initiated at step 1436 and implemented at step 1422, having again fewer entries and different probabilities assigned to the runs of lengths common with codebooks 1104 and 1102.

The method of decoding the information is shown schematically in FIG. 14b, although in less detail than is the method of encoding shown in FIG. 14a. The codewords are received at 1450 and are separated into amplitude and location components at 1452. At 1460, the codewords are converted into runlengths. This step involves two substeps, the inverse of steps 1424 and 1422 as shown in FIG. 14a. The codestring is broken up into individual codewords, a runlength is identified with the particular code. At 1476, the codestring is examined to determine if a new codebook should be used. Use of a new codebook is signified by a prearranged code accessible to both coder and decoder. If a new codebook is to be used, it is selected at 1478 and applied at 1460. If not, a test is applied at 1474 to determine if the entire run has been decoded. If not, the method of decoding returns to 1460 to decode the next runlength, using the same codebook as used for the previous runlength. If the entire run has been decoded, the method moves on to step 1464 to combine the amplitudes and list of frequencies to create a block of coefficients with amplitudes, which are inverse transformed at 1466, combined at 1468 and stored or displayed at 1470.

It will be understood that implementation of this embodiment of the method of the invention requires deployment of more memory to store the additional codebooks. The number of codebooks deployed will depend on the particular application's relative limitations with respect to memory and communications channel bandwidth.

Figure 10B:
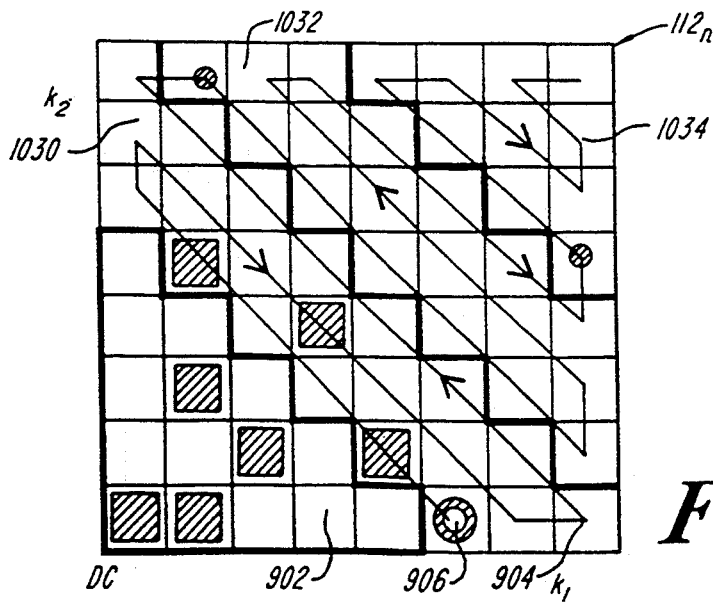
FIG. 10b shows schematically a block of transform coefficients to be encoded by runlength encoding by the method of the invention using different codebooks for different run segments as well as using vector quantization for a subset of the transform coefficients.

The multiple codebook method of the invention can be beneficially used with runlength coding alone, as discussed above. It can also be used with the combination vector quantization/runlength encoding method of the invention discussed above for greater efficiency over the prior art, over the disclosed combination of runlength and vector quantization and over use of the multiple codebook method with runlength coding alone. This combination is shown schematically in FIG. 10b, with transform block $112_n$ again divided into vector quantization region 902 and runlength encoding region 904. Runlength region 904 is itself divided into three segments 1030, 1032 and 1034, the boundaries between which are indicated by a dark border with a dark circle along the zig-zag path at the beginning of each segment. The lengths of runs beginning in each respective segment will be encoded at step 1322 based on an independent codebook for each of the sections, as explained above.

The method of the invention, even without multiple codebooks, will, in a typical case, provide an improved overall bitrate per coefficient transmitted over runlength encoding, and will provide improved memory and computation requirements as compared to vector quantization. Implementation of the multiple codebook aspect of the invention further improves the bitrate over traditional runlength coding.

Figure 12A:
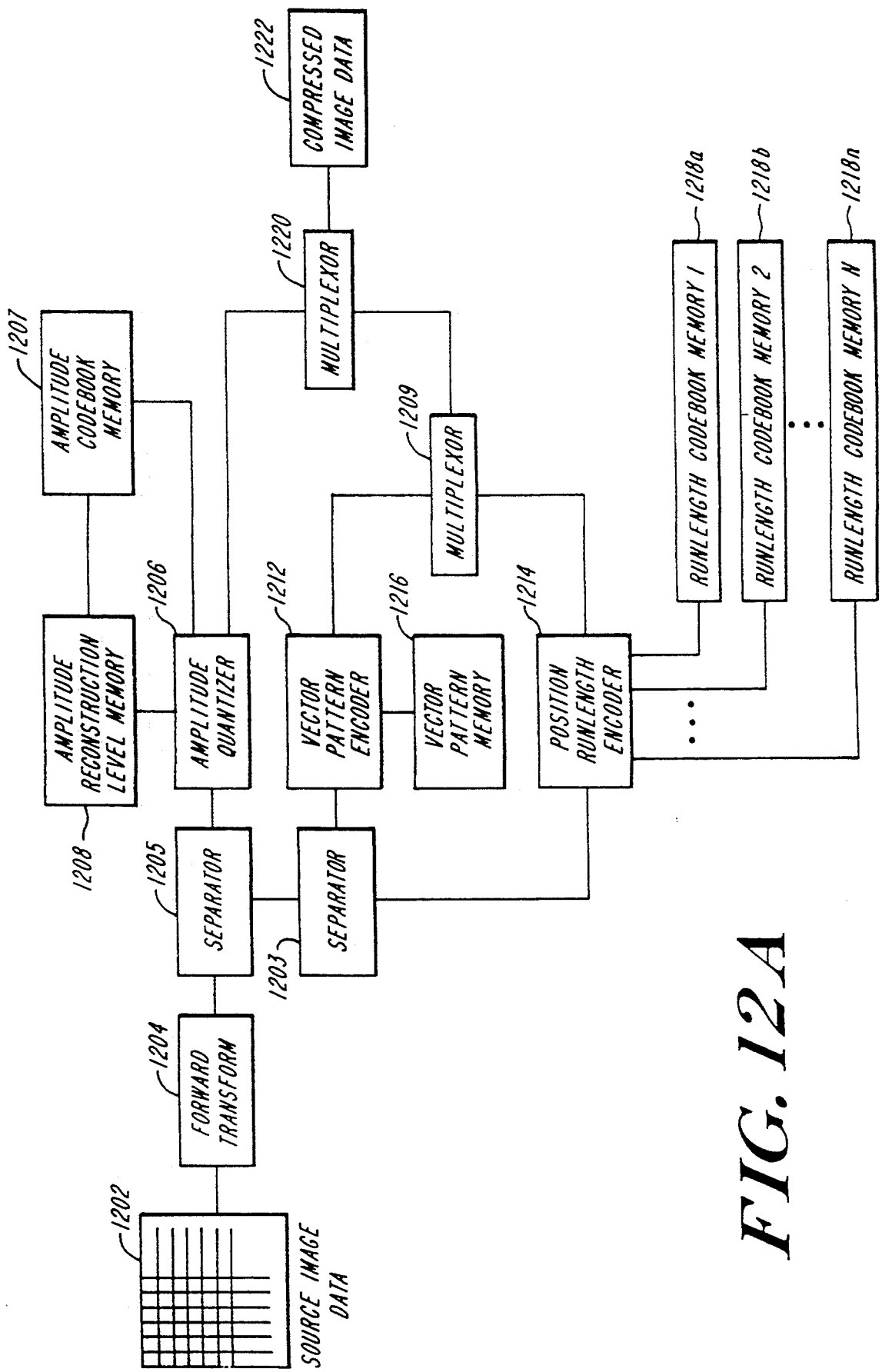
FIGS. 12a and b show schematically a preferred embodiment of the apparatus of the invention, with FIG. 12a showing the encoder portion and FIG. 12b showing the decoder portion.
Figure 12B:
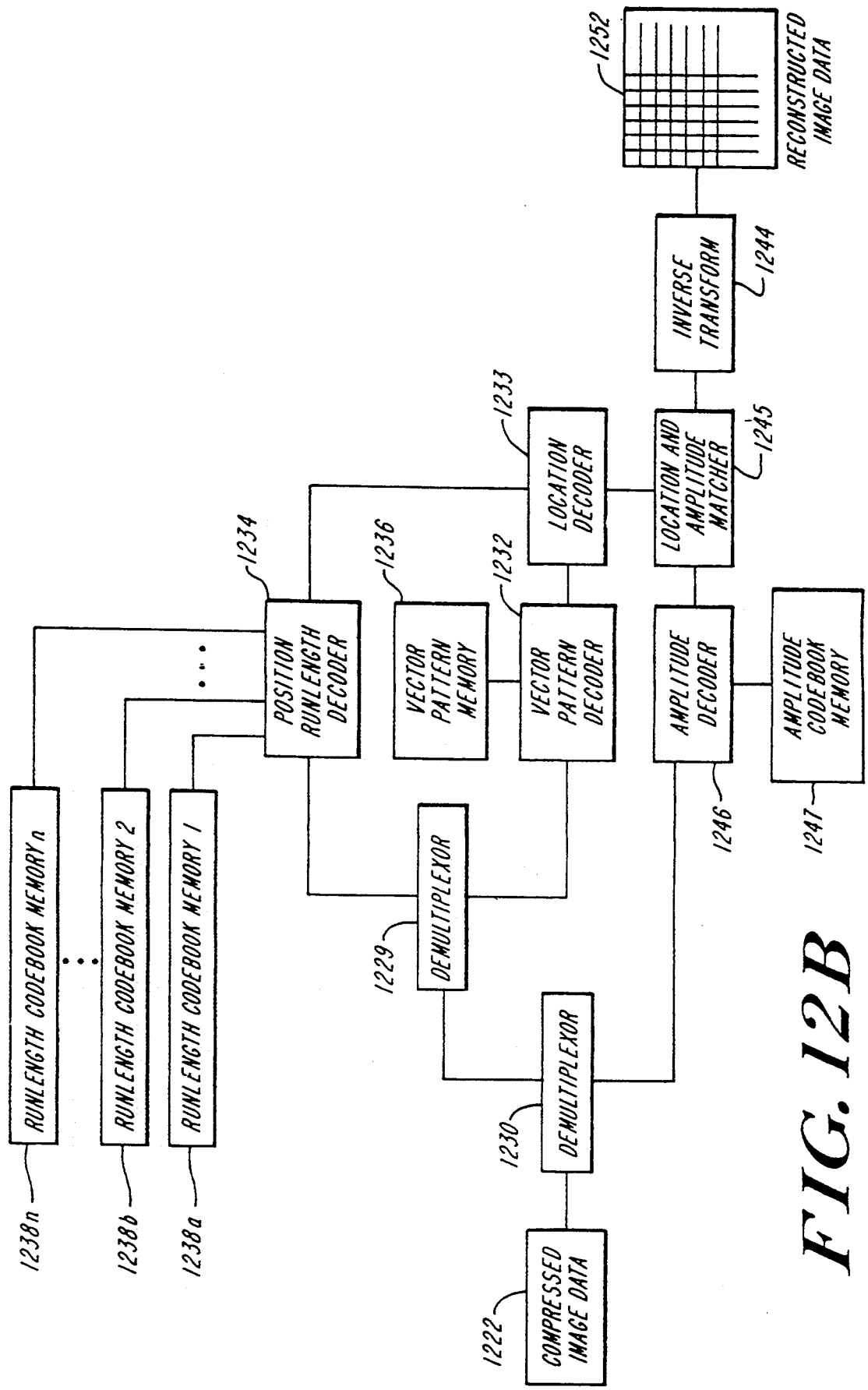

The apparatus of the invention is shown schematically in FIGS. 12a and 12b. FIG. 12a shows the encoder portion of the apparatus and FIG. 12b shows the decoder portion. An image is converted to sampled two dimensional source image data 1202. The source image data is divided up into blocks, typically $8 \times 8$ samples in each block. The source image data is passed, block by block to forward transform operator 1204. Upon a typical transformation, such as a DCT, the data is in an $8 \times 8$ block of a two dimensional frequency domain, with each element of the $8 \times 8$ block representing a continuous amplitude of a discrete spatial frequency.

Different components of the data are treated in the following stages of the apparatus. The amplitude is treated in an amplitude quantizer 1206, and the position information (corresponding to the spatial frequency of each amplitude) is treated in a vector pattern encoder 1212 and a runlength encoder 1214. It is not critical to the invention which module receives the data first, or whether they receive the data in series or in parallel, although parallel treatment is quicker. The embodiment shown in FIG. 12a is arranged according to a parallel architecture.

The signal is split into amplitude and two position components at multiplexor separator 1205. The continuous amplitudes are quantized by amplitude quantizer 1206 into discrete reconstruction levels, stored in amplitude reconstruction level table memory 1208. Amplitude quantizer 1206 assigns a codeword to each coefficient with reference to amplitude codebook memory 1207, which correlates a codeword to each reconstruction level maintained in reconstruction level table memory 1208. The output of amplitude quantizer 1206 is a block of codewords representing quantized amplitudes, each amplitude corresponding to a specific spatial frequency.

The position data from multiplexor 1205 may be further split at second separator 1203 into low spatial frequency and high spatial frequency components. The low frequency portion of the block is analyzed by vector pattern encoder 1212. The encoder matches the pattern of selected coefficient locations to patterns stored in vector pattern table memory 1216. The vector pattern table maps each pattern to a codeword. The codeword may be a uniform length codeword, or more typically, a variable length codeword established according to an appropriate entropy coding technique. Typically, if the probabilities of the patterns can be determined, entropy coding provides a more efficient overall coefficient bitrate than do uniform length codewords. Whether uniform or entropy coding is used, a vector pattern table is required to map the coefficient patterns to the codewords.

The data for the higher frequency portion of the block is analyzed by position runlength encoder 1214. Runlength encoder 1214 traverses the zig-zag path through the coefficients, and counts the number of non-selected coefficients between selected coefficients, thus establishing the lengths of each run between selected coefficients. Once measured, runlength encoder 1214 matches each length to a codeword with reference to runlength codebook stored in memory 1218a. Again, either fixed length codewords or variable length codewords can be used, depending on the evaluation of the memory and bandwidth considerations discussed above. If entropy coding is used, and if the multiple codebook method of the invention is used, then runlength encoder 1214 refers to codebooks 2 through n, stored in additional memories 1218b through 1218n. The location codewords from vector pattern encoder 1212 and position runlength encoder 1214 may optionally be combined at a multiplexor 1209. This combination step is not necessary, although it may provide efficiencies in some situations. The combination may be as simple as concatenating the codewords in a specified order. The quantized, coded amplitude data is combined with the coded vector quantization data and coded runlength data in multiplexor 1220 and a stream of compressed image data 1222 is produced.

The compressed image data 1222 is converted into a reconstructed image by the apparatus shown schematically in FIG. 12b. The compressed image data 1222 is split into its coded amplitude and location components by demultiplexor. The location information, if it has been combined at multiplexor 1209, is separated into vector quantization and runlength components by multiplexor 1229. If no combination is conducted in the coding portion of the apparatus, then each component is simply directed to its respective decoder 1232 or 1234. The vector pattern decoder 1232 receives each vector codeword and matches the codeword to a pattern with reference to vector pattern table memory 1236, which may be identical to vector pattern table memory 1216. However, due to the requirement for vector pattern table 1216 to be searched to match patterns, and vector pattern table memory 1236 to be searched simply to match codewords, the arrangement of the data in the two memories is often different, in order to optimize searching methods in each. The output of pattern decoder 1232 is a pattern of locations for selected coefficients. However, the amplitudes of those coefficients is not determined by pattern decoder 1232.

The runlength decoder 1234 receives each runlength codeword and matches the codeword to a runlength, with reference to runlength codebook memory 1238a. Runlength decoder uses either fixed or variable length codeword decoding (using additional codebooks 2 through n, stored in memories 1238b through 1238n) according to the technique used in the encoding portion of the system.

The amplitude portion of the compressed image data stream 1222 is decoded by amplitude decoder 1246 with reference to amplitude codebook memory 1247. The entries in amplitude codebook memory 1247 match the codewords to the corresponding reconstruction levels, analogous to the mapping in amplitude codebook memory 1207. However, the precise continuous amplitudes of the coefficients, as were input into amplitude quantizer 1206, can not be recovered, because the variations within reconstruction levels has not been preserved, only the membership in a reconstruction level having been recorded. For this reason (among other less important reasons), the reconstructed image data will not be precisely the same as the source image data. It is the goal of signal processing techniques to minimize the perceptual differences in the image, despite the unavoidable difference in the image data.

At location decoder 1233, the decoded location components of the transform block data output from vector pattern decoder 1232 and position runlength decoder 1234 are combined to specify all of the selected positions in the transform block. At location and amplitude matcher 1245, the combined positions are matched up with the respective amplitudes generated by amplitude decoder 1246, for the locations of selected coefficients. The result is a transform block, e.g., $8 \times 8$ for the example used in the figures, of coefficients, in the spatial frequency locations of the original block $112_n$, with quantized amplitudes. This $8 \times 8$ transform block is used as an input to inverse transform operator 1244, which transforms the data from the spatial frequency domain to the two-dimensional image domain.

The foregoing apparatus description has focussed on the passage of data representing one block $102_n$ of pixel data through the apparatus. Each block $102_n$ of pixel data passes through the apparatus in the same manner. The plurality of reconstructed $8 \times 8$ blocks of pixel data are recombined (in the most rudimentary case, simply by placing them side by side in an order corresponding to the order in which they were established) to form a reconstructed image 1252.

A variable threshold may be used in the selection of the coefficients, rather than a fixed threshold. Variable threshold is used typically for two reasons. First, different thresholds may be used for different blocks. Second, within the same block, the low frequency coefficients are encoded better using a lower threshold due to well known reasons relating to the human perceptual apparatus.

The foregoing discussion has assumed an image that is characterized by pixel amplitudes according to a grayscale, i.e. a black and white image. The invention is also applicable to color or multi-channel images. In the case of black and white recordings of images, each pixel element is a single, discrete element. In the case of color recordings, a set of channels, or groups of pixels is used for each picture element. For instance, in a color value scheme known as RGB, each color is represented by a combination of amounts of the colors red (R), green (G) and blue (B). A separate color "channel" for each of these three colors is provided. In the RGB system, each channel has the same number of pixels per line across an image (for instance on a video screen) and the same number of lines in a vertical direction. Other color value systems, discussed below, may have a different number of samples per line for different channels. The pixel elements are typically located adjacent each other on the display device, so that when they are displayed simultaneously (as observed by the observer), they combine to form the colors of the original image.

The RGB color value scheme is useful for certain applications, but it is not the most convenient for mathematical manipulation of color values. Other color schemes are more useful, typically those which include a channel representing the luminance values of the image. Luminance is generally described as the intensity of light emitted by or reflected from a surface in a given direction per unit of apparent area. In general, a three channel color space defined by luminance and two other dimensions is equivalent to the RGB color space. A typical luminance color space is the Y (luminance), i (in phase) q (quadrature) color space used by the National Television Standards Committee for television broadcast in the United States. Other luminance color spaces include the Commission International de l'Eclairage (CIE), Y, x, y (luminance and two chrominance channels), and its variants, and Y, u, v (also luminance and two chrominance channels) and many more.

In the context of the present invention, the method of the invention can be beneficially practised on each independent channel of a multi-channel system. The data for each channel is processed separately, and recombined after coding and decoding according to known techniques. Thus, it may be beneficial to use the multiple codebook aspect of the invention, using different codebooks for one channel as compared to another channel. Further, the boundary between the application of the vector quantization method and the runlength method can differ for any given block from one channel to another. For instance, for chrominance channels, the region for vector quantization can be much smaller, since, typically, fewer coefficients are selected for coding in the chrominance channels. In fact it is not necessary to use the same method at all from one channel to the next. Vector quantization combined with runlength coding using multiple codebooks could be used for one channel, with another channel being coded using runlength coding with multiple codebooks alone, without using vector quantization at all.

The foregoing discussion has described the invention with respect to two dimensional image-type data. It is also applicable to the processing of signals in three or more dimensions. Signals of this nature include video, certain types of sonar and radar signals, signals describing three dimensional physical scenes, such as holograms and solid-body models, etc. Further signals specifying physical properties such as temperature, electric field, magnetic field, density, color, etc. of three-dimensional entities (such as buildings, animals, landscapes) may be described in data spaces having as many more dimensions than three as physical properties to be specified. The principles are the same, except that additional dimensions are involved.

Considering a three-dimensional embodiment, the source data is in three dimensions, such as the three spatial dimensions, with an intensity amplitude for each point in three-dimensional space. This three dimensional data is transformed, e.g. according to a DCT type transform, into a data space characterized by coefficients in three spatial frequency dimensions, each coefficient having an amplitude. The source data is converted to the transform space in three dimensional chunks, rather than the two-dimensional blocks of a two-dimensional system. Similarly, the data in the transformed frequency domain is handled in three-dimensional chunks.

Identification of the locations in the transformed chunk of selected coefficients is the same as in two dimensions, except that there are many more possible combinations of possible patterns with respect to a vector quantization, and the zig-zag pattern is traversed in three dimensions, and may assume a spiral-type shape, emanating from the DC coefficient. It should be noted that neither the zig-zag nor a spiral path is sacrosanct. Other suitable paths are within the contemplation of the invention.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

For instance, rather than two-dimensional image data, any other two dimensional data can be treated according to the invention, including the motion-compensated residual signal. The multiple or adaptive codebook runlength encoding aspect of the invention may be used alone or in combination with the aspect of the invention combining vector quantization and runlength encoding, which, similarly, can be used without the multiple codebook aspect of the invention. Any number of multiple codebooks can be used, rather than the three typically used in the examples.

In the examples discussed, concentrating on image data, vector quantization has been used for the low spatial frequencies while runlength encoding has been used for the high frequencies. However, if the type of data is most often characterized by long runs of non-selected coefficients in the low, or some other frequency region, then runlength, rather than vector quantization should be used to encode that segment of the transform block. Similarly, vector quantization should be used to encode portions of the block having relatively short runs. Further, rather than using runlength and vector quantization methods of encoding, the invention entails dividing the transform block into regions, and applying a coding technique to each region, which technique has efficiencies pertinent to the pattern of selected coefficients prevalent in that region. Thus, application of other techniques of encoding, if their efficiencies justify it, are contemplated within the scope of the invention.

Further, although the invention has been described with respect to encoding the location information with respect to coefficients being selected or not being selected depending on their amplitudes, the invention can be applied to any coding technique where certain of an ordered group of elements are selected, according to any criteria, and the location information with respect to the ordering principal is required. The invention relates only to specifying the location information. In fact, the invention relates also to specifying location information even where no amplitude information is involved.

Having described the invention, what is claimed is:

1. A method of encoding location information pertaining to a source position signal characterized by positions of a set of selected coefficients, ordered in at least one dimension, said method comprising the steps of:
   a. for a first component of said position signal, generating a signal encoding the locations of said selected coefficients by vector quantization; and
   b. for a second component of said position signal, generating a signal encoding the locations of said selected coefficients by runlength encoding.

2. The method of claim 1 said step of generating a signal by runlength encoding comprising the steps of:
   a. for a first run segment of said second component of said position signal, encoding the locations of said selected coefficients using a first codebook; and
   b. for at least one additional segment of said second component of said position signal, encoding the locations of said selected coefficients using at least one additional codebook.

3. A method of runlength encoding location information pertaining to a source position signal characterized by positions of a set of selected coefficients, ordered in at least one dimension, said method comprising the steps of:
   a. for a first run segment of said position signal, generating a signal encoding the locations of said selected coefficients using a first codebook; and
   b. for at least one additional segment of said position signal, generating a signal encoding the locations of said selected coefficients using at least one additional codebook.

4. A method of encoding location information pertaining to a source position signal characterized by positions of a set of selected coefficients, ordered in at least one dimension, said method comprising the steps of:
   a. for a first component of said position signal, generating a signal encoding the locations of said selected coefficients by a method that groups the locations into a pattern in at least one dimension; and
   b. for a second component of said position signal, generating a signal encoding the locations of said selected coefficients by a method that measures the distance between the locations of selected coefficients.

5. A method of encoding location information pertaining to a source position signal characterized by positions of a set of selected coefficients, ordered in at least one dimension, there being a generally expected pattern of selected coefficients in said source position signal, said method comprising the steps of:
   a. for a first component of said position signal, generating a signal encoding the locations of said selected coefficients by a first method that has a first efficiency with respect to the generally expected pattern of selected coefficients in said first component; and
   b. for a second component of said position signal, generating a signal encoding the locations of said selected coefficients by a second method that has a second efficiency with respect to the generally expected pattern of selected coefficients in said second component,
   wherein said second efficiency is higher than the efficiency of said first method with respect to the generally expected pattern of selected coefficients in said second component and wherein said first efficiency is higher than the efficiency of said second method with respect to the generally expected pattern of selected coefficients in said first component.

6. A method of decoding a signal based on encoding a source position signal characterized by positions of a set of selected coefficients, ordered in at least one dimension, said encoding signal having been generated by the steps of: for a first component of said position signal, generating a signal encoding the locations of said selected coefficients by vector quantization; and for a second component of said position signal, generating a signal encoding the locations of said selected coefficients by runlength encoding; said method of decoding comprising the steps of:
   a. decoding said signal encoding the locations of said selected coefficients that was generated by runlength encoding; and
   b. decoding said signal encoding the locations of said selected coefficients that was generated by vector quantization.

7. The decoding method of claim 6, said step of runlength encoding having further included the steps of: for a first run segment of said second component of said position signal, encoding the locations of said selected coefficients using a first codebook; and for at least one additional segment of said second component of said position signal, encoding the locations of said selected coefficients using at least one additional codebook, said decoding method further comprising the steps of:
   a. decoding said locations encoded using a first codebook by using a first reverse codebook; and
   b. decoding said locations encoded using a second codebook by using a second reverse codebook.

8. A method of decoding a signal based on encoding by runlength a source position signal characterized by positions of a set of selected coefficients, ordered in at least one dimension, said encoding signal having been generated by the steps of: for a first run segment of said position signal, generating a signal encoding the locations of said selected coefficients using a first codebook; and for at least one additional segment of said position signal, generating a signal encoding the locations of said selected coefficients using at least one additional codebook, said decoding method comprising the steps of:
   a. decoding said locations encoded using a first codebook by using a first reverse codebook; and
   b. decoding said locations encoded using a second codebook by using a second reverse codebook.

9. A method of decoding a signal based on encoding a source position signal characterized by positions of a set of selected coefficients, ordered in at least one dimension, said encoding signal having been generated by the steps of: for a first component of said position signal, generating a signal encoding the locations of said selected coefficients by a method that groups the locations into a pattern in at least one dimension; and for a second component of said position signal, generating a signal encoding the locations of said selected coefficients by a method that measures the distance between the locations of selected coefficients, said method of decoding comprising the steps of:
   a. decoding said signal encoding the locations that was generated by said method that groups the locations into a pattern in at least one dimension; and
   b. decoding said signal encoding the locations that was generated by said method that measures the distance between the locations of selected coefficients.

10. A method of decoding a signal based on encoding a source position signal characterized by positions of a set of selected coefficients, ordered in at least one dimension, there being a generally expected pattern of selected coefficients in said source position signal, said encoding signal having been generated by the steps of: for a first component of said position signal, generating a signal encoding the locations of said selected coefficients by a first method that has a first efficiency with respect to the generally expected pattern of selected coefficients in said first component; and for a second component of said position signal, generating a signal encoding the locations of said selected coefficients by a second method that has a second efficiency with respect to the generally expected pattern of selected coefficients in said second component,
   wherein said second efficiency is higher than the efficiency of said first method with respect to the generally expected pattern of selected coefficients in said second component and wherein said first efficiency is higher than the efficiency of said second method with respect to the generally expected pattern of selected coefficients in said first component.
   said method of decoding comprising:
   a. decoding said signal encoding the locations that was generated by said first method; and
   b. decoding said signal encoding the locations that was generated by said second method.

11. An apparatus for encoding location information pertaining to a source position signal characterized by positions of a set of selected coefficients, ordered in at least one dimension, said apparatus comprising:
   a. a runlength encoder for encoding the locations of said selected coefficients; and
   b. connected to said runlength encoder:
      i. first codebook memory for encoding the locations of said selected coefficients in a first run segment of said position signal; and
      ii. at least one additional codebook memory for encoding the locations of said selected coefficients in at least one additional run segment of said position signal.

12. An apparatus for encoding location information pertaining to a source position signal characterized by positions of a set of selected coefficients, ordered in at least one dimension, said apparatus comprising:
   a. a vector quantizer for generating a signal encoding the locations of said selected coefficients in a first component of said position signal; and
   b. a runlength encoder for encoding the locations of said selected coefficients in a second component of said position signal.

13. An apparatus for decoding a signal based on encoding a source position signal characterized by positions of a set of selected coefficients, ordered in at least one dimension, said encoding signal been generated by the steps of: for a first component of said position signal, generating a signal encoding the locations of said selected coefficients by vector quantization; and for a second component of said position signal, generating a signal encoding the locations of said selected coefficients by runlength encoding; said apparatus for decoding comprising:

a. means for decoding said signal encoding the locations of said selected coefficients that was generated by runlength encoding; and b. means for decoding said signal encoding the locations of said selected coefficients that was generated by vector quantization.

14. An apparatus for decoding a signal based on encoding by runlength a source position signal characterized by positions of a set of selected coefficients, ordered in at least one dimension, said encoding signal having been generated by the steps of: for a first run segment of said position signal, generating a signal encoding the locations of said selected coefficients using a first codebook; and for at least one additional run segment of said position signal, generating a signal encoding the locations of said selected coefficients using at least one additional codebook, said decoding apparatus comprising:

a. a runlength decoder for decoding said locations; and b. connected to said runlength decoder:

i. first codebook memory for decoding the locations of said selected coefficients in said first run segment of said position signal; and ii. at least one additional codebook memory for decoding the locations of said selected coefficients in said at least one additional run segment of said position signal.

15. An apparatus for decoding a signal based on encoding a source position signal characterized by positions of a set of selected coefficients, ordered in at least one dimension, said encoding signal having been generated by the steps of: for a first component of said position signal, generating a signal encoding the locations of said selected coefficients by a method that groups the locations into a pattern in at least one dimension; and for a second component of said position signal, generating a signal encoding the locations of said selected coefficients by a method that measures the distance between the locations of selected coefficients, said apparatus for decoding comprising:

a. pattern decoder means for decoding said signal encoding the locations of said selected coefficients by said method that groups the locations into a pattern in at least one dimension; and b. distance decoder means for decoding said signal encoding the locations of said selected coefficients by said method that measures the distance between the locations of selected coefficients.

16. An apparatus for decoding a signal based on encoding a source position signal characterized by positions of a set of selected coefficients, ordered in at least one dimension, there being a generally expected pattern of selected coefficients in said source position signal, said encoding signal having been generated by the steps of: for a first component of said position signal, generating a signal encoding the locations of said selected coefficients by a first method that has a first efficiency with respect to the generally expected pattern of selected coefficients in said first component; and for a second component of said position signal, generating a signal encoding the locations of said selected coefficients by a second method that has a second efficiency with respect to the generally expected pattern of selected coefficients in said second component, wherein said second efficiency is higher than the efficiency of said first method with respect to the generally expected pattern of selected coefficients in said second component and wherein said first efficiency is higher than the efficiency of said second method with respect to the generally expected pattern of selected coefficients in said first component, said apparatus for decoding comprising:

a. first decoder means for decoding said signal encoding the locations of said selected coefficients by said first method; and b. second decoder means for decoding said signal encoding the locations of said selected coefficients by said second method.

* * * * *